United States Patent
Ohya et al.

(10) Patent No.: US 9,219,872 B2
(45) Date of Patent: Dec. 22, 2015

(54) IMAGE PICKUP APPARATUS, DRIVING METHOD FOR IMAGE PICKUP APPARATUS, IMAGE PICKUP SYSTEM, AND DRIVING METHOD FOR IMAGE PICKUP SYSTEM

(71) Applicant: CANON KABUSHIKI KAISHA, Tokyo (JP)

(72) Inventors: Takeru Ohya, Machida (JP); Tomoya Onishi, Ayase (JP); Daisuke Kobayashi, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/194,310

(22) Filed: Feb. 28, 2014

(65) Prior Publication Data

US 2014/0247381 A1    Sep. 4, 2014

(30) Foreign Application Priority Data

Mar. 1, 2013   (JP) ................................ 2013-040676

(51) Int. Cl.
| | |
|---|---|
| H04N 3/14 | (2006.01) |
| H04N 5/335 | (2011.01) |
| H04N 5/3745 | (2011.01) |
| H04N 5/217 | (2011.01) |
| H04N 5/378 | (2011.01) |

(52) U.S. Cl.
CPC ........... H04N 5/37455 (2013.01); H04N 5/217 (2013.01); H04N 5/378 (2013.01)

(58) Field of Classification Search
CPC .............. H04N 5/3742; H04N 5/3745; H04N 5/37455; H04N 5/376; H04N 5/3765; H04N 5/378; H04N 3/155
USPC .......................................... 348/296, 302, 303
See application file for complete search history.

(56) References Cited

U.S. PATENT DOCUMENTS

| | | | | |
|---|---|---|---|---|
| 8,698,931 | B2* | 4/2014 | Kobayashi et al. | 348/308 |
| 8,804,020 | B2* | 8/2014 | Kobayashi et al. | 348/308 |
| 8,964,080 | B2* | 2/2015 | Kobayashi et al. | 348/302 |
| 2006/0065813 | A1 | 3/2006 | Yamaguchi | |
| 2010/0265350 | A1 | 10/2010 | Ogasawara et al. | |
| 2011/0058078 | A1* | 3/2011 | Kume | 348/294 |
| 2011/0290985 | A1 | 12/2011 | Kume | |
| 2012/0175500 | A1 | 7/2012 | Saito | |
| 2012/0176518 | A1 | 7/2012 | Yamazaki et al. | |
| 2013/0146751 | A1* | 6/2013 | Hagihara | 250/208.1 |
| 2013/0154705 | A1* | 6/2013 | Sakurai et al. | 327/179 |
| 2013/0208160 | A1* | 8/2013 | Tanaka | 348/302 |
| 2013/0242125 | A1* | 9/2013 | Yang et al. | 348/222.1 |

FOREIGN PATENT DOCUMENTS

| | | |
|---|---|---|
| JP | 2005-323331 A | 11/2005 |
| WO | 99/66710 A1 | 12/1999 |

OTHER PUBLICATIONS

Stuart Kleinfelder, et al.,"A 10000 Frames/s CMOS Digital Pixel Sensor", IEEE Journl of Solid-State Circuits, Dec. 2001,vol. 36,No. 12,p. 2049-2059.

* cited by examiner

*Primary Examiner* — Kelly L Jerabek
(74) *Attorney, Agent, or Firm* — Canon USA, Inc., IP Division

(57) ABSTRACT

In an image pickup apparatus, a counter configured to output a count signal to a second AD conversion unit starts, with a delay, counting clock signals as compared with a counter configured to output a count signal to a first AD conversion unit by a time period corresponding to a delay of a reference signal output to a comparator of the second AD conversion unit with respect to a reference signal output to the comparator of the first AD conversion unit.

17 Claims, 15 Drawing Sheets

IMAGE PICKUP APPARATUS, DRIVING METHOD FOR IMAGE PICKUP APPARATUS, IMAGE PICKUP SYSTEM, AND DRIVING METHOD FOR IMAGE PICKUP SYSTEM

BACKGROUND OF THE INVENTION

1. Field of the Invention

The present invention relates to an image pickup apparatus, and the invention particularly relates to an image pickup apparatus including plural analog-to-digital conversion units.

2. Description of the Related Art

An image pickup apparatus including plural analog-to-digital conversion units (hereinafter, which will be referred to as AD conversion units) configured to perform analog-to-digital conversion (hereinafter, which will be referred to as AD conversion) is proposed. Japanese Patent Laid-Open No. 2005-323331 describes a configuration in which the AD conversion unit is provided for each pixel column. In addition, a configuration in which the AD conversion unit is provided for each pixel is described in Stuart Kleinfelder, SukHwan Lim, Xinqiao Liu, and Abbas El Gamal, "A 10000 Frames/s CMOS Digital Pixel Sensor", IEEE JOURNAL OF SOLID-STATE CIRCUITS, DECEMBER 2001, VOL. 36, NO. 12, pp. 2049-2059. In both documents, each AD conversion unit includes a comparator configured to output a comparison result signal indicating a result of a comparison between an analog signal and a reference signal in which a potential is changed depending on time and a counter configured to count clock signals. The AD conversion unit described in each of Japanese Patent Laid-Open No. 2005-323331 and "A 10000 Frames/s CMOS Digital Pixel Sensor" obtains a counted value of the counter at a time when a signal value of the comparison result signal is changed as a digital signal where the analog signal is subjected to the AD conversion.

SUMMARY OF THE INVENTION

According to an aspect of the present invention, there is provided an image pickup apparatus including: a plurality of incident ray conversion units each configured to convert incident rays into charge; a plurality of analog-to-digital conversion units each provided with a comparator and configured to convert a signal output from the incident ray conversion units into a digital signal; a plurality of counters each configured to output a count signal obtained by counting clock signals; and a reference signal output unit configured to output a reference signal to each of the comparators of the plurality of analog-to-digital conversion units, in which a part of the analog-to-digital conversion units among the plurality of analog-to-digital conversion units generate the digital signal based on a result of a comparison conducted by the comparator between the signal output by the incident ray conversion unit and the reference signal and the count signal output by a part of the counters among the plurality of counters, the other part of the analog-to-digital conversion units among the plurality of analog-to-digital conversion units generate the digital signal based on a result of a comparison conducted by the comparator between the signal output by the incident ray conversion unit and the reference signal and the count signal output by the other part of the counters among the plurality of counters, and the other part of the counters start, with a delay, counting the clock signals as compared with the part of the counters by a time period corresponding to a delay of the reference signal output to the comparators of the other part of the analog-to-digital conversion units with respect to the reference signal output to the comparators of the part of the analog-to-digital conversion units.

In addition, according to another aspect of the present invention, there is provided an image pickup apparatus including: a plurality of incident ray conversion units each configured to convert incident rays into charge; a first analog-to-digital conversion unit and a second analog-to-digital conversion unit each provided with a comparator and configured to convert a signal output by the incident ray conversion units into a digital signal; a first counter configured to output a count signal obtained by counting clock signals to the first analog-to-digital conversion unit; a second counter configured to output a count signal obtained by counting clock signals to the second analog-to-digital conversion unit; and a reference signal output unit configured to output a reference signal in which a signal level is changed dependently on time to the comparator, in which each of the first analog-to-digital conversion unit and the second analog-to-digital conversion unit generates the digital signal based on a result of a comparison conducted by the comparator between a signal output by the incident ray conversion unit and the reference signal and the count signal, the second analog-to-digital conversion unit has an electric path from the reference signal output unit longer than the first analog-to-digital conversion unit has, and the second counter starts, with a delay, counting the clock signals as compared with the first counter.

In addition, according to another aspect of the present invention, there is provided an image pickup apparatus including: a plurality of incident ray conversion units; a plurality of analog-to-digital conversion units each provided with a comparator and configured to convert a signal output from the incident ray conversion units into a digital signal; a counter configured to output a count signal obtained by counting clock signals; a reference signal output unit configured to output a reference signal in which a signal level is changed dependently on time to each of the comparators of the plurality of analog-to-digital conversion units; and a count signal control unit, in which each of the plurality of analog-to-digital conversion units generates the digital signal based on a result of a comparison conducted by the comparator between a signal output by the incident ray conversion unit and the reference signal and the count signal, and the count signal control unit delays, by a time period with respect to the reference signal output to a part of the analog-to-digital conversion units which corresponds to a delay of the reference signal output to the other part of the analog-to-digital conversion units, the count signal output to the other part of analog-to-digital conversion units as compared with the count signal output to the part of analog-to-digital conversion units.

In addition, according to another aspect of the present invention, there is provided a drive method for an image pickup apparatus that includes: a plurality of incident ray conversion units; a plurality of analog-to-digital conversion units each provided with a comparator and configured to convert a signal output from the incident ray conversion units into a digital signal; a plurality of counters each configured to output a count signal obtained by counting clock signals; a reference signal output unit configured to output a reference signal to each of the comparators of the plurality of analog-to-digital conversion units, a part of the analog-to-digital conversion units among the plurality of incident ray conversion units generating the digital signal based on a result of a comparison conducted by the comparator between the signal output by the incident ray conversion unit and the reference signal and the count signal output by a part of the counters among the plurality of counters, and the other part of the analog-to-digital conversion units among the plurality of analog-to-digital conversion units generating the digital signal based on a result of a comparison conducted by the comparator between the signal output by the incident ray conversion unit and the reference signal and the count signal output by the other part of the counters among the plurality of counters, the drive method including: detecting a delay amount of the reference signal output to the comparators of the other part of the analog-to-digital conversion units with respect to the reference signal output to the comparators of the part of the analog-to-digital conversion units; and causing the other part of the counters to start, with a delay, counting the clock signals as compared with the part of the counters based on the delay amount.

In addition, according to another aspect of the present invention, there is provided a drive method for an image pickup system that includes: an image pickup apparatus including a plurality of incident ray conversion units each configured to convert incident rays into charge, a plurality of analog-to-digital conversion units each provided with a comparator and configured to convert a signal output from the incident ray conversion units into a digital signal, a plurality of counters each configured to output a count signal obtained by counting clock signals, a reference signal output unit configured to output a reference signal in which a signal level is changed dependently on time to each of the comparators of the plurality of analog-to-digital conversion units, and a control unit; and a signal processing unit configured to process the digital signal output by the image pickup apparatus, a part of the analog-to-digital conversion units among the plurality of incident ray conversion units generating the digital signal based on a result of a comparison conducted by the comparator between the signal output by the incident ray conversion unit and the reference signal and the count signal output by a part of the counters among the plurality of counters, and the other part of the analog-to-digital conversion units among the plurality of incident ray conversion units generating the digital signal based on a result of a comparison conducted by the comparator between the signal output by the incident ray conversion unit and the reference signal and the count signal output by the other part of the counters among the plurality of counters, the drive method comprising: causing the signal processing unit to detect a delay amount of the reference signal output to the comparators of the other part of the analog-to-digital conversion units with respect to the reference signal output to the comparators of the part of the analog-to-digital conversion units based on the digital signals generated by the plurality of analog-to-digital conversion units; and causing the control unit to allow the other part of the counters to start, with a delay, counting the clock signals as compared with the part of the counters based on the delay amount.

Further features of the present invention will become apparent from the following description of exemplary embodiments with reference to the attached drawings.

DESCRIPTION OF THE EMBODIMENTS

In the image pickup apparatus in related art, with respect to a part of analog-to-digital conversion units (hereinafter, which will be referred to as first AD conversion unit) among plural analog-to-digital conversion units, a delay of a reference signal output to another part of analog-to-digital conversion units (hereinafter, which will be referred to as second AD conversion unit) among the plural analog-to-digital conversion units from a reference signal output unit may be caused. In this case, a problem occurs that the digital signal generated by the second AD conversion unit contains noise derived from the delay of the reference signal when the same count signal is output to the plural analog-to-digital conversion units.

Hereinafter, embodiments of the present invention will be described with reference to the drawings.

First Embodiment

Figure 1:
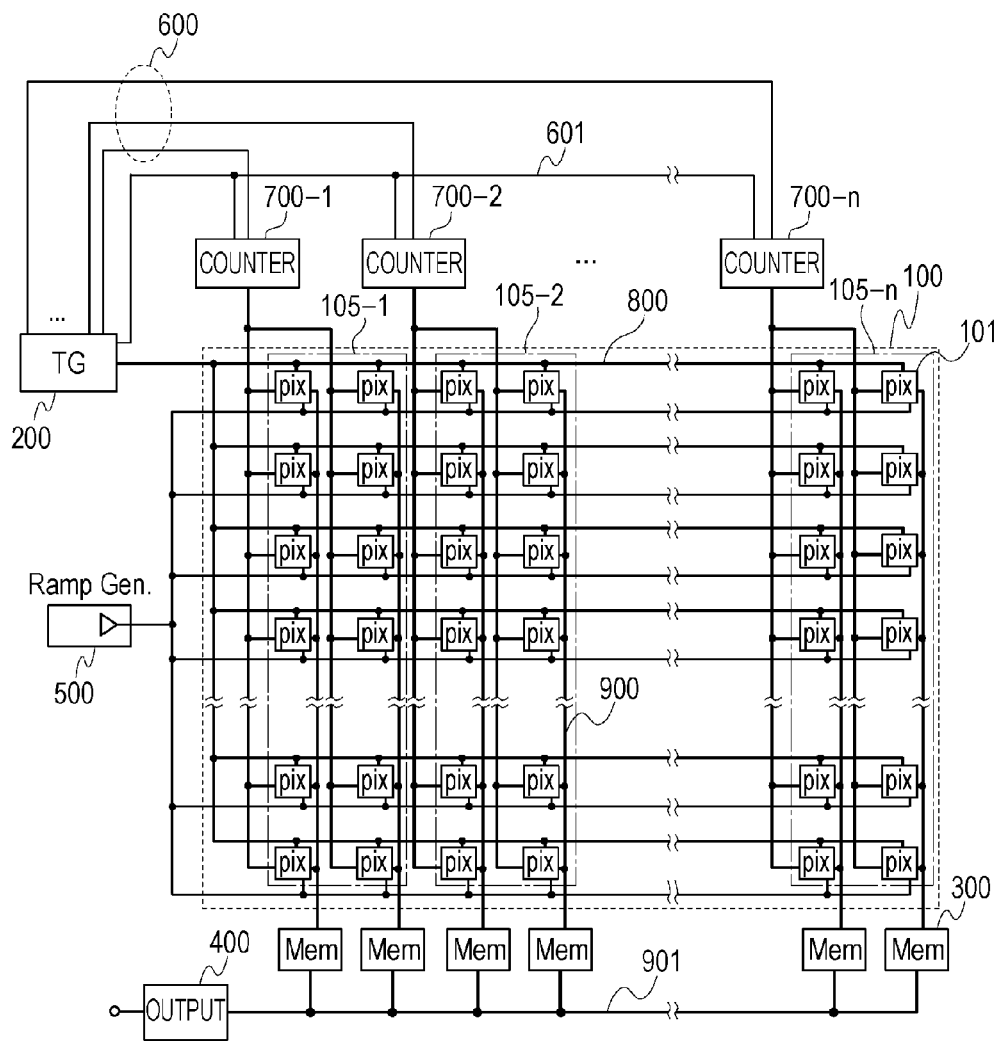
FIG. 1 is a block diagram of an example of an image pickup apparatus.

FIG. 1 is a block diagram illustrating a configuration of an image pickup apparatus according to the present embodiment. The image pickup apparatus includes a pixel array 100 in which plural pixels 101 are arranged in a matrix. The image pickup apparatus further includes a timing generator (hereinafter, which will be referred to as TG) 200, line memories 300, an output unit 400, a reference signal output unit 500, and counters 700. A control unit of the present embodiment corresponds to the TG 200.

A subarray 105 including the pixels 101 for two columns is constructed in the image pickup apparatus according to the present embodiment. FIG. 1 illustrates a mode provided with n subarrays 105. One counter 700 is electrically connected to each of the subarrays 105. A counter start signal is output from the TG 200 via a counter start signal output line 600 to each of the counters 700. A clock signal functioning as a reference for a count operation is output via a clock output line 601. In FIG. 1, the same clock output line 601 is electrically connected to all of the counters 700, but a configuration in which the counters may respectively use different clock signals may be adopted. In the example, the subarray 105 sets two columns as the unit, but the other number of columns may also be used.

The TG 200 is configured to generate a signal for controlling an operation conducted by the image pickup apparatus and output a control signal via a control signal output line 800. The control signal output line 800 is illustrated by a single line to simplify the drawing but may include plural signals lines.

The line memory 300 is provided while corresponding to a column of the pixels 101 in the pixel array 100 and holds a digital signal transmitted via a vertical transfer bus 900. When the line memory 300 is selected by a column-selection circuit which is not illustrated in the drawing, the held digital signal is output. The digital signal output from the line memory 300 is transmitted to the output unit 400 via a horizontal transfer bus 901.

The vertical transfer bus 900 and the horizontal transfer bus 901 are both composed of a single signal line. In this case, the pixels 101 and the line memory 300 outputs the digital signals in serialization. The vertical transfer bus 900 and the horizontal transfer bus 901 may also be composed of plural signal lines. In this case, the pixels 101 and the line memory 300 output at least a part of bits of the digital signals in parallel. The output unit 400 buffers the digital signals input via the horizontal transfer bus 901 and outputs the digital signals to an external part.

Figure 2A:
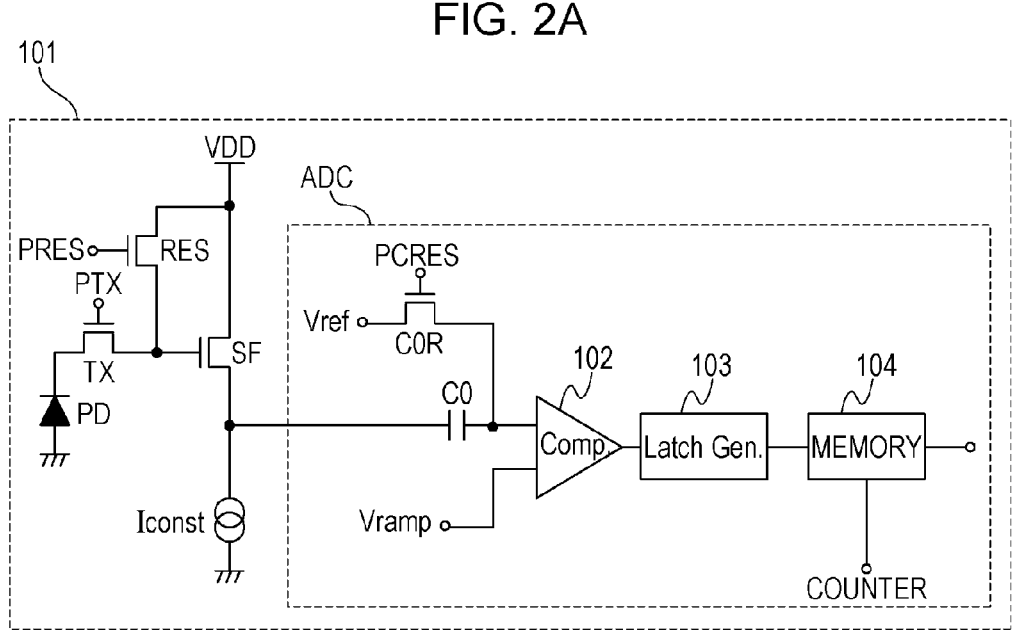
FIG. 2A is a block diagram of an example of a pixel.

Next, a configuration example of the pixel 101 will be described. FIG. 2A illustrates a configuration of the pixel 101 according to the present embodiment. The pixel 101 is composed by including a photoelectric conversion unit PD and an AD conversion unit ADC and configured to output a digital signal. A reference signal Vramp used for the AD conversion is output from the reference signal output unit 500 to the AD conversion units ADC of the respective pixels 101. According to the present embodiment, the reference signal output unit 500 is provided in an external part of the pixel array 100. According to the configuration illustrated in FIG. 1, the reference signal output unit 500 is provided on a left side of the pixel array 100, and the reference signal Vramp is output from the left side of the pixel array 100.

The pixel 101 includes the photoelectric conversion unit PD, transistors TX, SF, RES, and COR, a capacitance element CO, a comparator 102, a latch signal output unit 103, and an intra-pixel memory 104.

The photoelectric conversion unit PD generates and accumulates charge in accordance with an incident light quantity. When a signal PTX for controlling the continuity of the transistor TX is at a high level (hereinafter, which will be referred to as H level) in a vertical scanning circuit (not illustrated), the charge accumulated in the photoelectric conversion unit PD is transferred to a control node of the transistor SF. The transistor SF operates as a source follower circuit together with a current source Iconst, and the output is supplied to one of the input nodes of the comparator 102 via the capacitance element CO. When a signal PRES for controlling the continuity of the transistor RES is at the H level in the vertical scanning circuit (not illustrated), a potential at the control node of the transistor SF is reset to a potential in accordance with a power supply VDD.

When a signal PCRES for controlling the transistor CoR is at the H level in the vertical scanning circuit (not illustrated), one of the nodes of the comparator 102 is reset to a reference potential Vref.

A comparison result signal indicating a comparison result between a potential at one of the input nodes of the comparator 102 and a level of the reference signal Vramp supplied to the other input node is output to the latch signal output unit 103. When the magnitude of the potentials at both the input nodes of the comparator 102 is inverted, the signal value of the comparison result signal is changed. When the signal value of the comparison result signal is changed, the latch signal output unit 103 outputs a latch signal.

The intra-pixel memory 104 receives the latch signal and holds the counted value of the counter 700. The intra-pixel memory 104 further receives a selection signal from the vertical scanning circuit (not illustrated) and outputs the digital signal to the line memory 300.

Figure 2B:
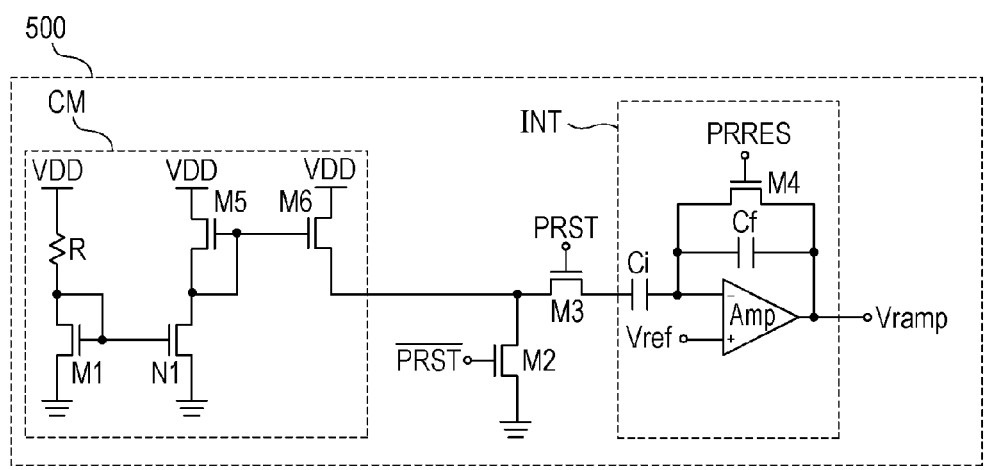
FIG. 2B is a block diagram of an example of a reference signal output unit.

Next, a configuration example of the reference signal output unit 500 will be described. FIG. 2B illustrates a configuration example of the reference signal output unit 500 according to the present embodiment.

The reference signal output unit 500 includes the current mirror unit CM, transistors M2 and M3, and an integration unit INT.

A current mirror unit CM includes a resistance R and respective transistors M1, M5, M6, and N1. The resistance R and the transistor M1 are electrically connected to each other between the power supply voltage VDD and a ground voltage GND in serial, and a control node of the transistor M1 is electrically connected to a common contact between the resistance R and a main node of the transistor M1. One of main nodes of the transistor N1 is electrically connected to the ground voltage GND, and the other main node is electrically connected to one of main nodes and a control node of the transistor M5. A control node of the transistor N1 is electrically connected to the control node of the transistor M1. The other main node of the transistor M5 is electrically connected to the power supply voltage VDD, and the control node is also electrically connected to a control node of the transistor M6. One of main nodes of the transistor M6 is electrically connected to a common contact between the transistors M2 and M3.

The integration unit INT includes an integration circuit composed of a differential amplifier Amp, a capacitance element Ci, and a feedback capacitance element Cf and further includes a transistor M4 for resetting the feedback capacitance element Cf.

The current mirror unit CM and the integration unit INT are electrically connected to each other via the transistor M3. The transistor M2 is controlled by a signal having an opposite phase to a signal PRST for controlling the continuity of the transistor M3. The signals illustrated in FIG. 2B are output from the TG 200 to the control nodes of the respective transistors M2, M3, and M4.

Figure 3A:
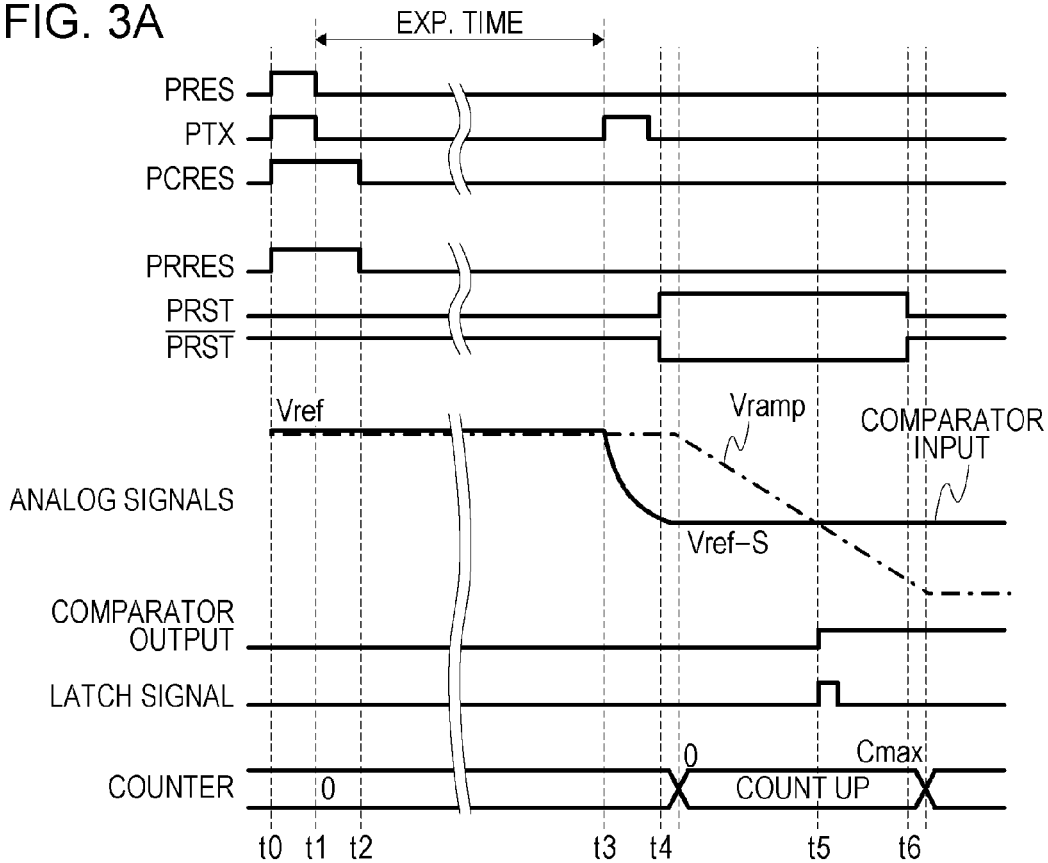
FIG. 3A is a timing chart of an example of an operation by the pixel.

Next, an AD conversion operation in the respective pixels will be described. FIG. 3A is a timing chart for describing an operation in the pixels 101 according to the present embodiment. In FIG. 3A, PRES, PTX, PCRES correspond to the signals illustrated in FIG. 2A, and PRES and PRST correspond to the signals illustrated in FIG. 2B.

In FIG. 3A, the potential at the one input node of the comparator 102 is represented by a solid line as a comparator input. An output of the reference signal output unit 500 which is output to the other input node of the comparator 102 is represented by a dashed-dotted line as the reference signal Vramp, which is denoted by analog signals. A comparison result signal output by the comparator 102 is denoted by comparator output. The latch signal output by the latch signal output unit 103 is denoted by latch signal, and the counted value of the counter 700 is denoted by counter.

At a time t0, the vertical scanning circuit sets the signals PRES and PTX at the H level and the transistors RES and TX in a continuity state. According to this, the potential at the photoelectric conversion unit PD is reset on the basis of the power supply VDD. An output of the source follower circuit composed of the transistor SF and the current source Iconst corresponds to an output in accordance with the power supply VDD.

At the time t0, the TG 200 sets the signal PRST at a Low level (hereinafter, which will be referred to as L level), the transistor M3 in a non-continuity state, and the transistor M2 in a continuity state.

In addition, at the time t0, the vertical scanning circuit sets the signal PCRES at the H level and the transistor CoR in a continuity state. According to this, the potential at the one input node of the comparator 102 is reset.

Furthermore, at the time t0, the TG 200 sets the signal PRRES at the H level and the transistor M4 in a continuity state. According to this, the feedback capacitance element Cf of the reference signal output unit 500 is reset.

At a time t1, the vertical scanning circuit sets the signals PRES and PTX at the L level and the transistors TX and RES in a non-continuity state. According to this, the reset of the photoelectric conversion unit PD is cancelled, and a state in which the charge can be accumulated is established.

At a time t2, the vertical scanning circuit sets the signal PCRES at the L level and the transistor CoR in a non-continuity state. According to this, a potential difference between a potential obtained by resetting the potential at the control node of the transistor SF and the reference potential Vref is held at the capacitance element CO.

In addition, at the time t2, the TG 200 sets the signal PRRES at the L level and the transistor M4 in a non-continuity state. According to this, the reset of the feedback capacitance element Cf is cancelled.

At a time t3, the vertical scanning circuit sets the signal PTX at the H level and transfers the charge accumulated in the photoelectric conversion unit PD to the control node of the transistor SF. According to this, the output of the source follower circuit is changed. When the change amount of this output is set as S, the potential at the one input node of the comparator 102 corresponds to Vref–S.

At a time t4, the TG 200 sets the signal PRST at the H level, the transistor M3 in a continuity state, and the transistor M2 in a non-continuity state. According to this, since an electric path between the current mirror unit CM and the capacitance element Ci is in a continuity state, the potential of the reference signal Vramp is progressively reduced in accordance with the current amount sourced at the current mirror unit CM. The counter 700 also starts the count operation for counting the clock signals.

At a time t5, when the magnitude between comparator input and the reference signal Vramp is inverted, the latch signal output unit 103 outputs the latch signal at the H level. The intra-pixel memory 104 receives this latch signal and holds the counted value at time point.

At a time t6, the TG 200 sets the signal PRST at the L level and stops the progressive reduction of the reference signal Vramp to end and the AD conversion period.

According to the present embodiment, the reference signal output unit 500 outputs the common reference signal Vramp to the AD conversion units ADC in all the pixels. A parasitic capacitance, and a delay in accordance with a length (wiring length) of the electric path from the reference signal output unit 500 is caused in the reference signal Vramp by a load capacitance of the AD conversion unit ADC on the basis of a resistance of the output line where the reference signal Vramp is transmitted.

For example, it is assumed that the count operations by all the counters 700 are started in time with the progressive reduction start timing of the reference signal Vramp in the subarray 105-1. Subsequently, in another subarray, after the counter 700 starts the count operation, the progressive reduction of the reference signal Vramp is started. In this case, the offset noise derived from the length of the wiring for transmitting the reference signal Vramp is included in the digital signal output from the pixel. Therefore, even when the pixel array 100 is irradiated with uniform light, shading is caused in the image generated on the basis of the digital signal output by the image pickup apparatus. Since the counter 700 starts the count operation prior to the progressive reduction of the reference signal Vramp, the dynamic range of the AD conversion unit ADC is narrowed.

Figure 3B:
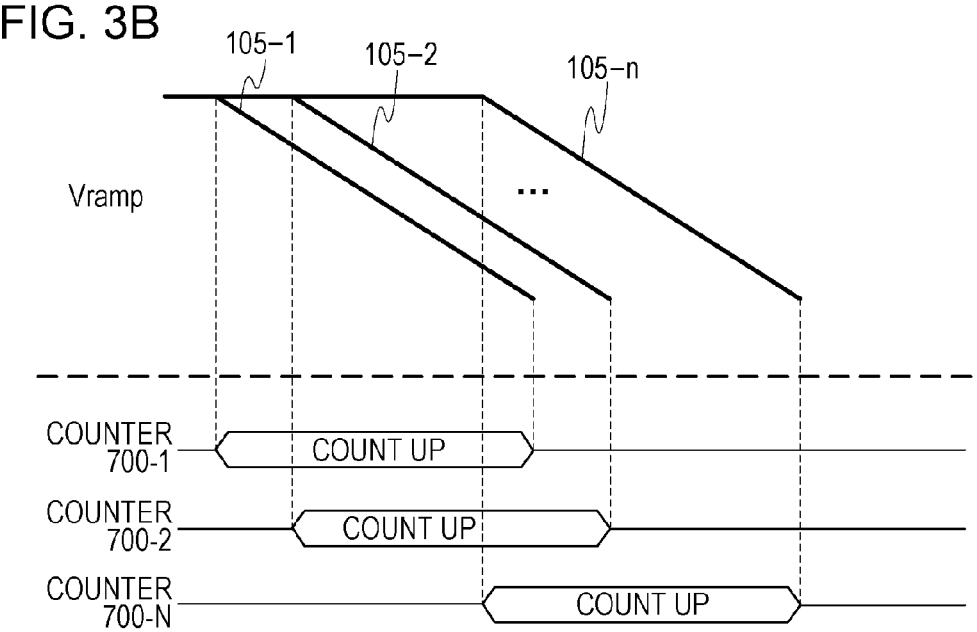
FIG. 3B is a timing chart of an example of an operation by the image pickup apparatus.

In the image pickup apparatus according to the present embodiment, the TG 200 delays the start of the counting of the clock signal by the counter 700 for each subarray 105 in accordance with the delay of the progressive reduction start timing of the reference signal Vramp. FIG. 3B illustrates the waveforms of the reference signal Vramp in the respective subarrays 105. In the n subarrays 105 illustrated in FIG. 1, the length of the wiring for transmitting the reference signal Vramp from the reference signal output unit 500 is longer in the ascending order from the subarray 105-1. In the subarray 105-1 closest to the reference signal output unit 500 among the n subarrays 105, the progressive reduction of the reference signal Vramp is started first among the n subarrays 105. The counter 700-2 that outputs the count signal to the subarray 105-2 then starts the count operation of counting the clock signals in retard of the counter 700-1 that outputs the count signal to the subarray 105-1. According to the present embodiment, when attention is paid on two counters among the counters 700-1, 700-2, . . . , 700-n, the counter provided while corresponding to the subarray 105 closer to the reference signal output unit 500 is a first counter, and the other counter is a second counter. For example, when attention is paid on the counters 700-1 and 700-2, the counter 700-1 is the first counter, and the counter 700-2 is the second counter. In this case, the count signal output by the counter 700-1 corresponding to the first counter to the AD conversion unit ADC included in the subarray 105-1 is a first count signal. The count signal output by the counter 700-2 corresponding to the second counter to the AD conversion unit ADC included in the subarray 105-2 is a second count signal.

Subsequently, a determination method for an operation start timing of the respective counters 700 will be described.

As an example of the determination method, a mode is proposed in which timings for the respective counters 700 to start the count operation are set on the basis of the lengths of the wires to the respective subarrays 105 from the reference signal output unit 500, the parasitic resistance estimated from the thicknesses of the wires, and the parasitic capacitance. In a case where the parasitic resistance and the parasitic capacitance of the wiring from the reference signal output unit 500 to the respective subarrays 105 are in direct proportion to the distance from the reference signal output unit 500, it is possible to cause the counters 700-1, 700-2, 700-3, . . . , and 700-n to sequentially start the operation at a certain time difference.

Another example of the determination method for the operation start timing of the respective counters 700 will be described. First, a signal PC0R is set at the H level, and the signals input to the comparator 102 are set as signals Vref in all the pixels in the vertical scanning circuit. The counter start signals supplied to the respective counters 700 are generated at a same timing in the TG 200. The delay amounts of the counter start signal are also varied in accordance with the lengths of the wires of the counter start signal output lines 600, but as compared with the reference signal output unit 500, the load driven by the TG 200 is set to be small to a negligible extent. Therefore, all the counters 700 are set to be operated at the same time. The digital signals held by the intra-pixel memories 104 of the respective pixels are ideally the digital signals having a same value. However, as described above, as the pixel of the subarray farther from the reference signal output unit 500, the signal value of the output digital signal is increased by the delay of the reference signal Vramp caused as the length of the wiring from the reference signal output unit 500 is longer. The start timings of the count operation conducted by the respective counters 700 are decided so that this increase in the signal value of the digital signal is closer to zero. As another method, the image generated on the basis of the digital signal output by the image pickup apparatus may be analyzed to decide the start timing of the count operation conducted by the counter 700. According to this method too, the input signals to the comparators 102 are the constant value Vref in all the pixels. The counter start signals supplied to the respective counters 700 are also the same, and all the counters 700 are operated at the same time. The image pickup apparatus then sequentially outputs the digital signals generated in the pixels to an external part of the image pickup apparatus. Shading is generated in the image generated on the basis of this digital signal by the delay of the reference signal Vramp since the length of the wiring from the reference signal output unit 500 is increased. It is possible to estimate the delay amount caused by the increase in the wiring length of the reference signal Vramp on the basis of a shape of the shading of this image. Timings for the counter start signals generated in the TG 200 of the respective counters 700 are set in accordance with the estimated delay amount of the reference signal Vramp. To set the counter start signals of the respective counters 700, the image pickup apparatus is desirably provided with a register that stores setting information on the delay amount of the counter start signal. In the image pickup apparatus according to the present embodiment, it is possible to set the appropriate start timings of the count operation conducted by the respective counters 700 in the above-described manner.

The image pickup apparatus according to the present embodiment sets the start timing of the count operation conducted by the counter 700 in accordance with the delay of the reference signal Vramp caused by the increase in the length of the wiring from the reference signal output unit 500. It is possible to reduce the offset noise of the digital signal due to the delay of the reference signal Vramp generated between plural analog-to-digital conversion units. Therefore, the shading hardly develops in the image generated on the basis of the digital signal output by the image pickup apparatus. In addition, it is possible to suppress the occurrence of the narrowing-down in the dynamic range of the AD conversion unit ADC caused when the count operation is started prior to the progressive reduction of the reference signal Vramp.

The photoelectric conversion unit PD is an example of an incident ray conversion unit. It suffices if the incident ray conversion unit may adopt a mode in which incident rays such as, for example, X-rays, visible light, or infrared rays are converted into charge.

Second Embodiment

Hereinafter, the image pickup apparatus according to the present embodiment will be described with reference to the drawings. In the following explanation, a point different from the first embodiment will mainly be described.

Figure 4:
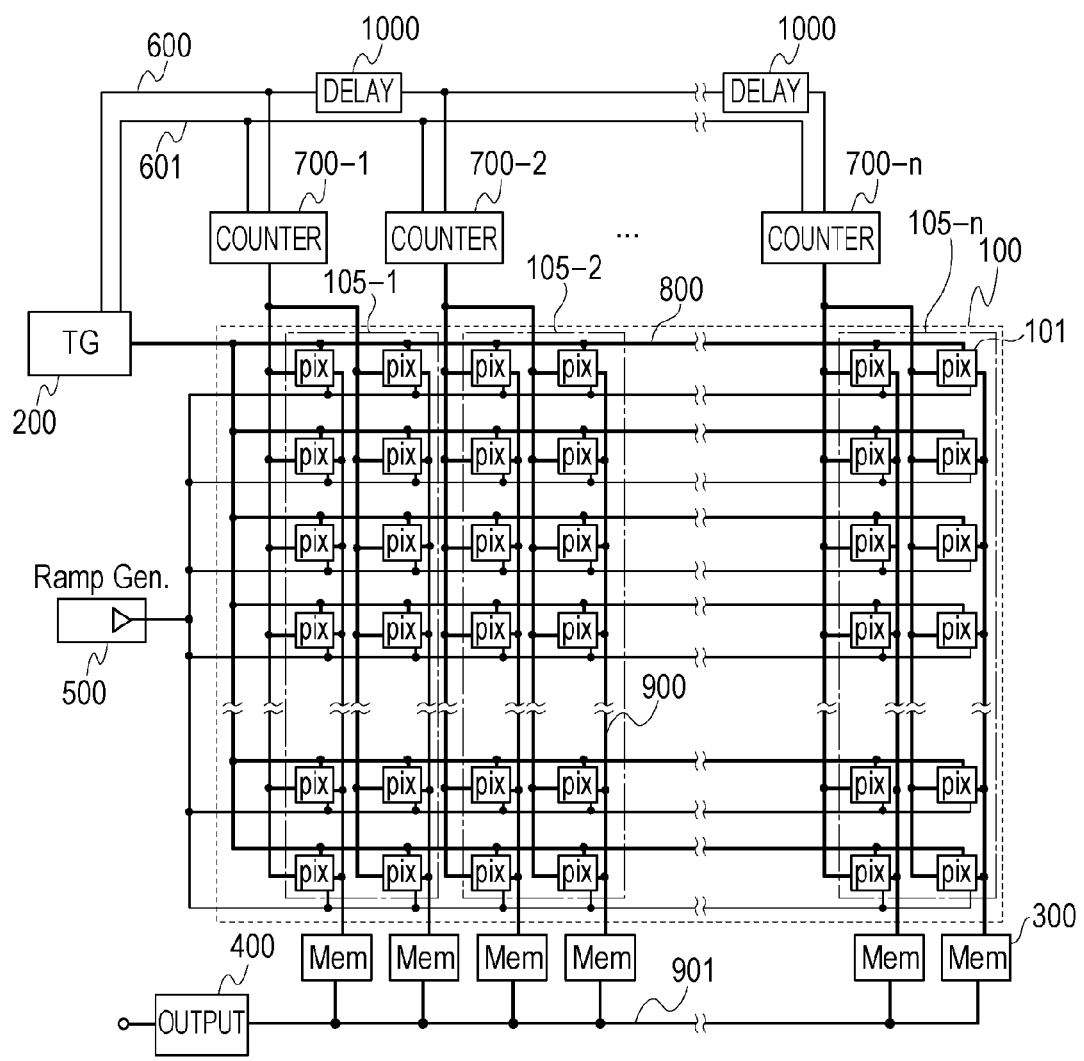
FIG. 4 is a block diagram of another example of the image pickup apparatus.

FIG. 4 is a block diagram illustrating a configuration of the image pickup apparatus according to the present embodiment. In the image pickup apparatus exemplified in FIG. 4, a component having the same function as that in FIG. 1 is assigned with the same reference symbol as that of FIG. 1, and a description thereof will be omitted.

In the image pickup apparatus according to the present embodiment, one counter start signal output line 600 is used. Delay circuits 1000 are provided between the respective counters 700 on the counter start signal output line 600. The respective delay circuits 1000 sequentially delay the counter start signals and output the counter start signal to the respective counters 700. The delay amount of the counter start signal is matched with the delay amount of the reference signal Vramp. According to this, similarly to the first embodiment, the count start timings of the counters 700 can be matched with the progressive reduction start timings of the reference signals Vramp in the respective subarrays 105 as illustrated in FIG. 3B. According to this, the image pickup apparatus according to the present embodiment can attain the effects similar to the image pickup apparatus according to the first embodiment.

Third Embodiment

Hereinafter, the image pickup apparatus according to the present embodiment will be described with reference to the drawings. In the following explanation, a point different from the first embodiment will mainly be described.

Figure 5:
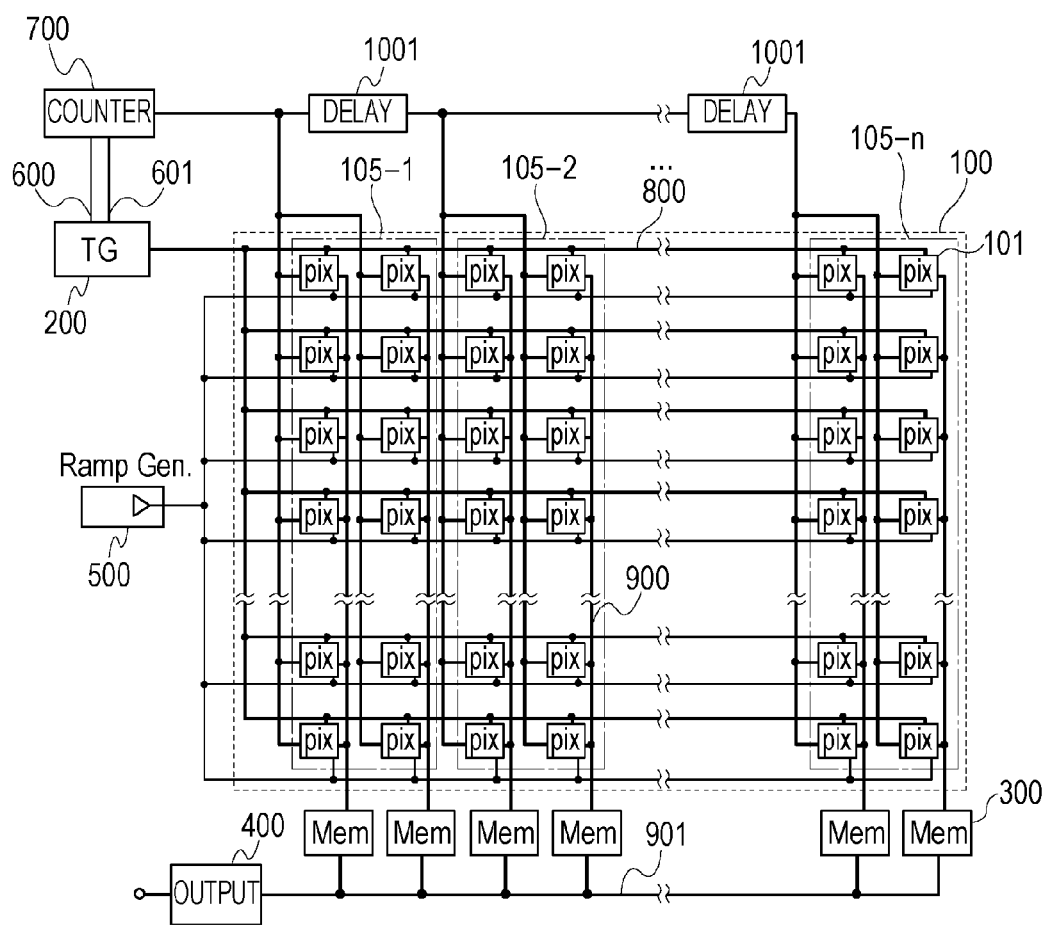
FIG. 5 is a block diagram of another example of the image pickup apparatus.

FIG. 5 is a block diagram illustrating a configuration of the image pickup apparatus according to the present embodiment. In the image pickup apparatus exemplified in FIG. 5, a component having the same function as that in FIG. 1 is assigned with the same reference symbol as that of FIG. 1, and a description thereof will be omitted.

In the image pickup apparatus according to the present embodiment, one counter 700 is used. The counter 700 is located on the left side of the pixel array 100 in the same manner as the reference signal output unit 500. The counter 700 outputs a count signal obtained by counting the clock signals. In a case where the counter 700 outputs an n-bit count signal, the electric paths from the counter 700 to the pixel array 100 via delay circuits 1001 are set as n signal lines. The delay circuits 1001 according to the present embodiment delay count signals of respective bits which are output by the counter 700 and output the count signals to the pixel array 100. The delay circuit 1001 according to the present embodiment corresponds to a count signal control unit configured to delay the count signals.

The delay amounts of the respective count signals of the delay circuits 1001 are matched with the delay amounts of the reference signals Vramp for each subarray 105. According to this, similarly to the first embodiment, the count start timings of the counters 700 can be matched with the progressive reduction start timings of the reference signals Vramp in the respective subarrays 105. According to this, the image pickup apparatus according to the present embodiment can attain the effects similar to the first embodiment.

Fourth Embodiment

Hereinafter, the image pickup apparatus according to the present embodiment will be described with reference to the drawings. In the following explanation, a point different from the first embodiment will mainly be described.

Figure 6A:
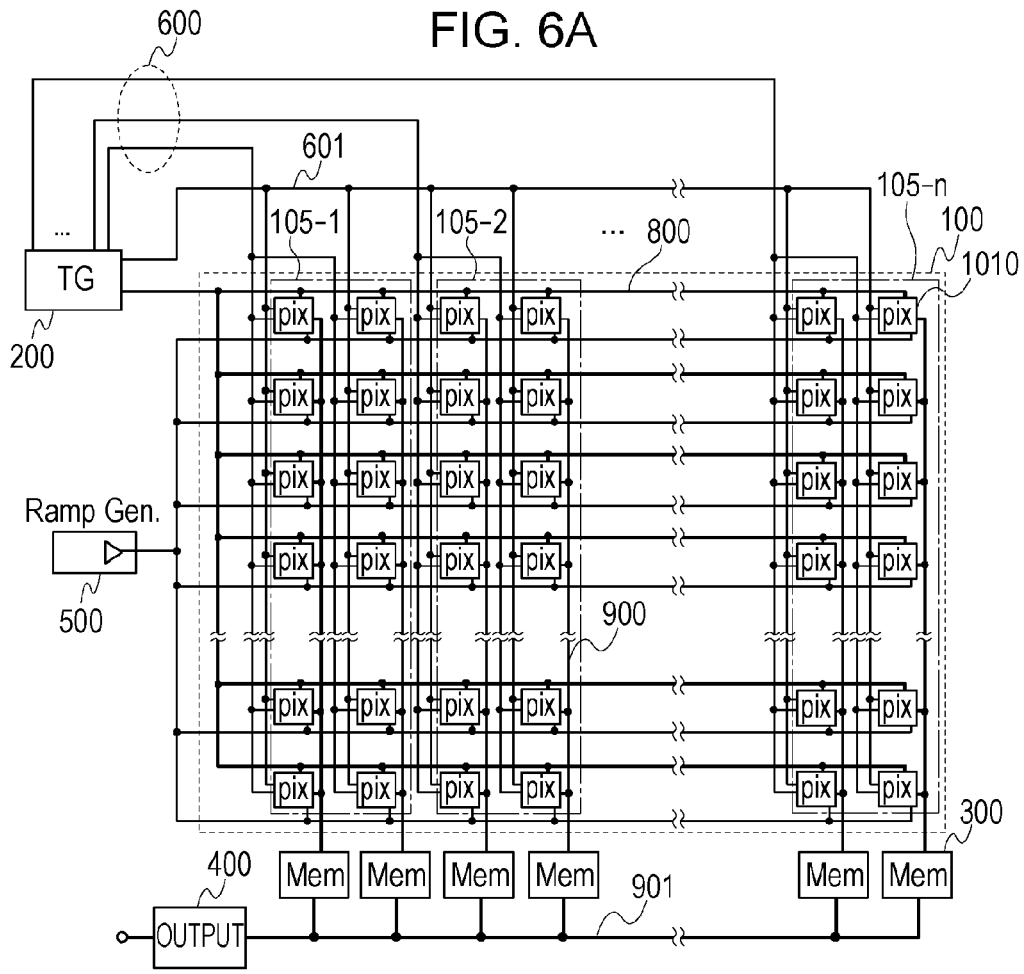
FIG. 6A is a block diagram of another example of the image pickup apparatus.

FIG. 6A is a block diagram illustrating a configuration of the image pickup apparatus according to the present embodiment. In the image pickup apparatus exemplified in FIG. 6A, a component having the same function as that in FIG. 1 is assigned with the same reference symbol as that of FIG. 1, and a description thereof will be omitted.

Figure 6B:
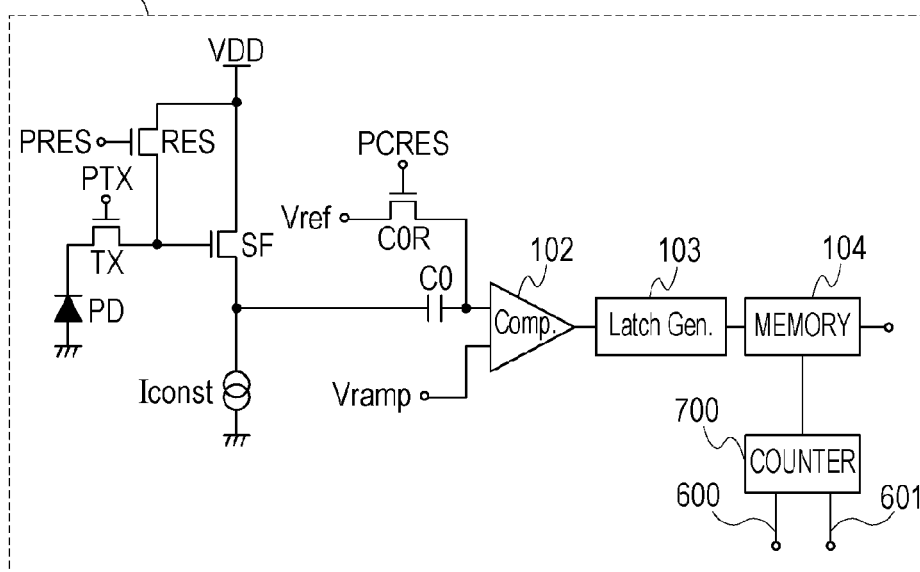
FIG. 6B is a block diagram of another example of the pixel.

According to the present embodiment, each of pixels 1010 includes the counter 700. FIG. 6B illustrates a block diagram of the pixel 1010 according to the present embodiment. The same counter start signal output line 600 is electrically connected to the counter 700 in one subarray 105. Timings of the counter start signals are adjusted for each subarray similarly to the first embodiment, and the count start timings of the counters 700 are matched with the progressive reduction start timings of the reference signals Vramp in the respective subarrays 105 as illustrated in FIG. 3B. According to this, the image pickup apparatus according to the present embodiment can attain the effects similar to the first embodiment.

Fifth Embodiment

Hereinafter, the image pickup apparatus according to the present embodiment will be described with reference to the drawings. In the following explanation, a point different from the first embodiment will mainly be described.

Figure 7:
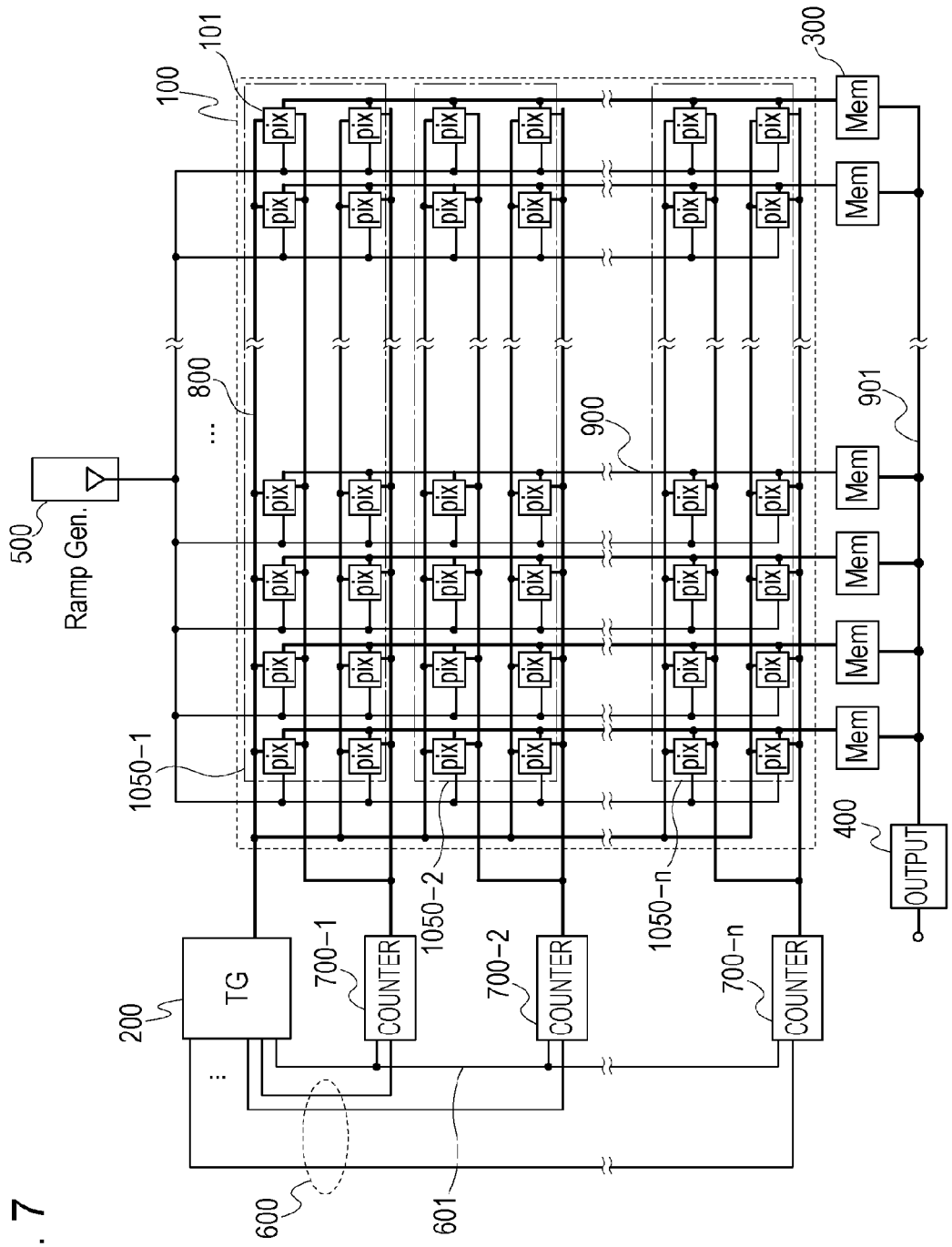
FIG. 7 is a block diagram of another example of the image pickup apparatus.

FIG. 7 is a block diagram illustrating a configuration of the image pickup apparatus according to the present embodiment. In the image pickup apparatus exemplified in FIG. 7, a component having the same function as that in FIG. 1 is assigned with the same reference symbol as that of FIG. 1, and a description thereof will be omitted.

In the image pickup apparatus according to the present embodiment, the reference signal output unit 500 is positioned on an upper side of the pixel array 100. In the image pickup apparatus according to the present embodiment, n subarrays 1050 are constructed while the pixels 101 for two columns are set as unit. One counter 700 is electrically connected to each of the subarrays 1050. The counter start signals are output to the respective counters 700 from the TG 200 via the counter start signal output line 600. The configuration in which the subarray 1050 sets the two columns as unit is an example, and the other number of columns may also be adopted.

In the image pickup apparatus according to the present embodiment too, the progressive reduction of the reference signal Vramp is sequentially started from the subarray 1050-1 closest to the reference signal output unit 500.

Timings for the TG 200 to output the counter start signals to the respective counters 700 are delayed more as the length of the wiring from the reference signal output unit 500 is increased for each subarray 1050 in the image pickup apparatus according to the present embodiment too. According to this, similarly to the mode illustrated in FIG. 3B, the count start timings of the respective counters 700 can be matched with the progressive reduction start timings of the reference signals Vramp in the respective subarrays 1050. According to this, the image pickup apparatus according to the present embodiment can attain the effects similar to the first embodiment.

Sixth Embodiment

Hereinafter, the image pickup apparatus according to the present embodiment will be described with reference to the drawings. In the following explanation, a point different from the first embodiment will mainly be described.

Figure 8:
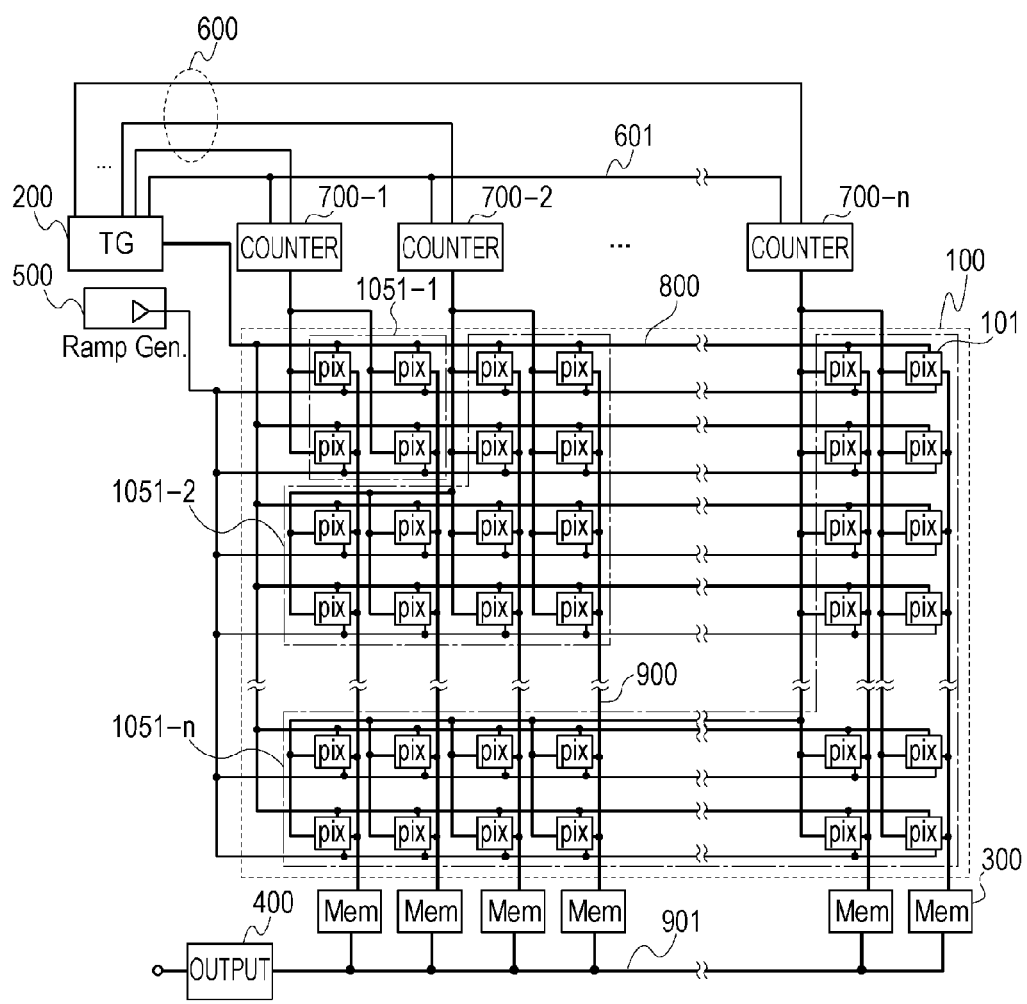
FIG. 8 is a block diagram of another example of the image pickup apparatus.

FIG. 8 is a block diagram illustrating a configuration of the image pickup apparatus according to the present embodiment. In the image pickup apparatus exemplified in FIG. 8, a component having the same function as that in FIG. 1 is assigned with the same reference symbol as that of FIG. 1, and a description thereof will be omitted.

In the image pickup apparatus according to the present embodiment, the reference signal output unit 500 is positioned at the upper left of the pixel array 100. In the image pickup apparatus according to the present embodiment, subarrays 1051 are constructed as illustrated in FIG. 8. The subarray 1051-1 includes pixels on two rows and two columns on the uppermost left side of the pixel array 100. The subarray 1051-2 includes pixels located on the right side, the lower side, and the lower right side of the subarray 1051-1. After that, the subarrays 1051 with the higher branched number continue towards the lower right. One counter 700 is electrically connected to the respective subarrays 1051. The counter start signals are output from the TG 200 to via the counter start signal output line 600 the respective counters 700. The number of pixels included in the subarray 1051 illustrated in FIG. 8 is an example and is not limited to this.

The progressive reduction of the reference signal Vramp is started sequentially from the subarray 1051-1 closest to the reference signal output unit 500 in the image pickup apparatus according to the present embodiment too. In the TG 200, timings for the output of the counter start signals to the respective counters 700 are adjusted in the image pickup apparatus according to the present embodiment too, and the count start timings of the respective counters 700 can be matched with the progressive reduction start timing of the reference signal Vramp in the respective subarrays 1051 as illustrated in FIG. 3B. According to this, the image pickup apparatus according to the present embodiment can attain the effects similar to the first embodiment.

Seventh Embodiment

Hereinafter, the image pickup apparatus according to the present embodiment will be described with reference to the drawings. In the following explanation, a point different from the first embodiment will mainly be described.

Figure 9:
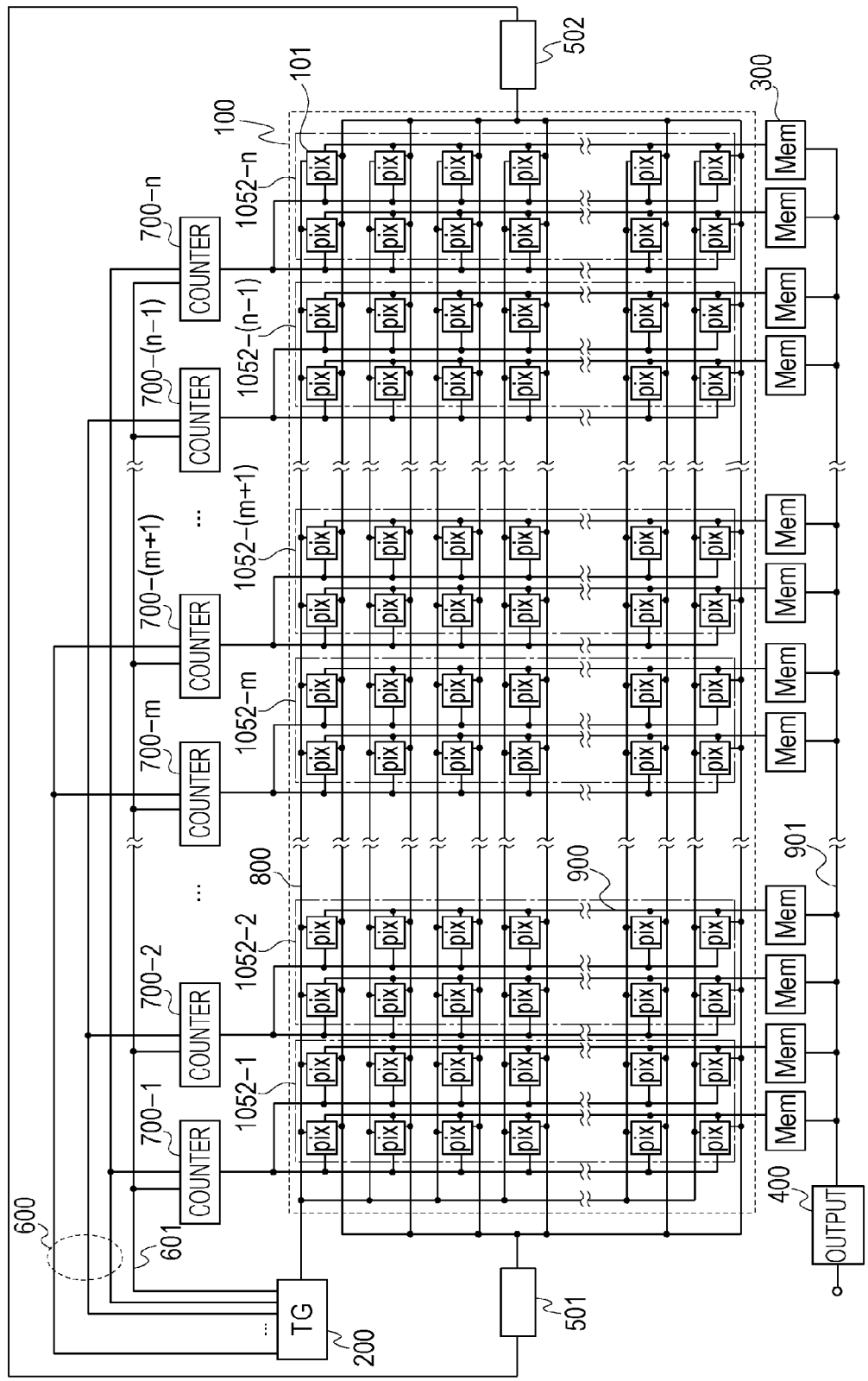
FIG. 9 is a block diagram of another example of the image pickup apparatus.

FIG. 9 is a block diagram illustrating a configuration of the image pickup apparatus according to the present embodiment. In the image pickup apparatus exemplified in FIG. 9, a component having the same function as that in FIG. 1 is assigned with the same reference symbol as that of FIG. 1, and a description thereof will be omitted.

In the image pickup apparatus according to the present embodiment, a current output unit 501 is arranged on the left side of the pixel array 100, and a current output unit 502 is arranged on the right side of the pixel array 100. The current output units 501 and 502 are provided so as to sandwich the pixel array.

Figure 10A:
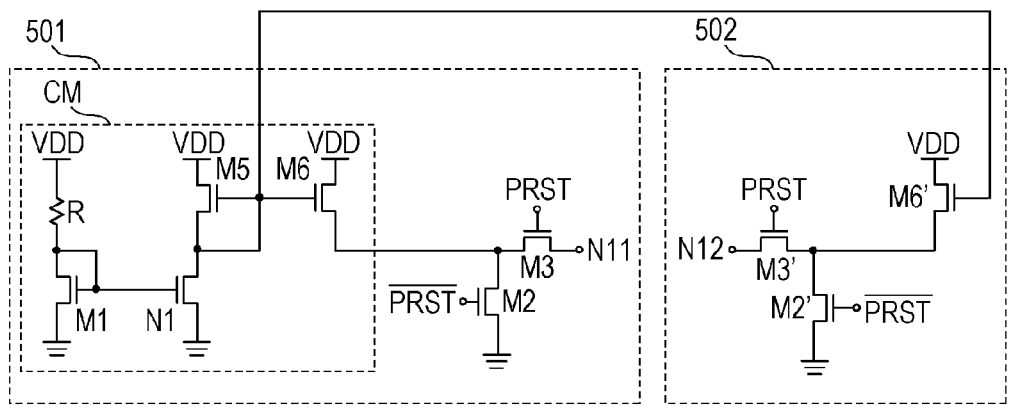
FIG. 10A is a block diagram of another example of the reference signal output unit.

Next, FIG. 10A illustrates configurations of the current output units 501 and 502. The current output unit 501 adopts a configuration in which the integration unit INT of the reference signal output unit 500 illustrated in FIG. 2B according to the first embodiment is not provided. When the TG 200 sets the signal PRST at the H level, the current output unit 501 outputs a current I to a node N11. A control node of a transistor M6' of the current output unit 502 is electrically connected to the control nodes of the transistors M5 and M6 of the current output unit 501. According to this, when the TG 200 sets the signal PRST at the H level, the current output unit 502 outputs the current I having the same current value as the node N11 to a node N12.

Figure 10B:
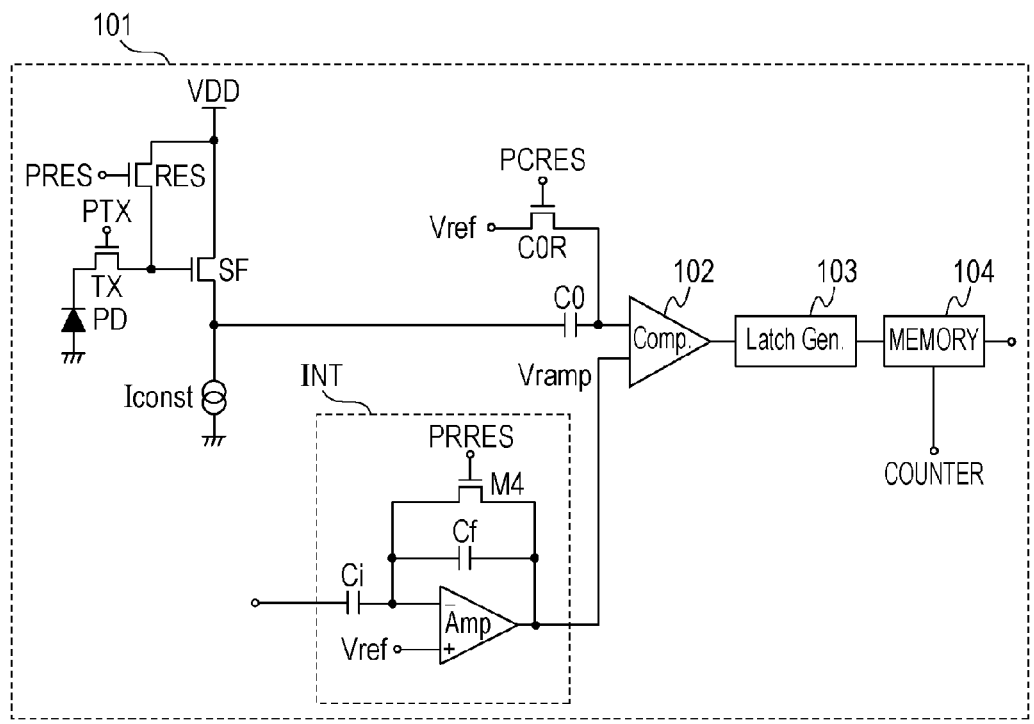
FIG. 10B is a block diagram of another example of the pixel.

FIG. 10B illustrates a configuration of the pixel 101 in the image pickup apparatus according to the present embodiment. The respective pixels 101 include the integration unit INT of the reference signal output unit 500 according to the first embodiment illustrated in FIG. 2B. In the image pickup apparatus according to the present embodiment, the currents I are output to the respective pixels 101 from the left and right of the pixel array by the current output units 501 and 502. The integration units INT of the respective pixels 101 output the reference signals Vramp at potential based on the current I output from one of the current output units 501 and 502 to the comparator 102. The reference signal output unit 500 according to the present embodiment corresponds to the integration unit INT provided to the pixel 101.

The image pickup apparatus according to the present embodiment includes n subarrays 1052 each including the pixels 101 for two columns. One counter is electrically connected to each of the subarrays 1052. The counter start signals are output to the respective counters 700 from the TG 200 via the counter start signal output line 600. With regard to the mutual subarrays 1052 in which the wiring length from the current output unit 501 is substantially equal to the wiring length from the current output unit 502, the TG 200 outputs the common counter start signals to the respective counters 700 electrically connected to each of the subarrays 1052. If it is described in terms of the mode of FIG. 9, the TG 200 outputs the common counter start signals to the counter 700-1 and the counter 700-n respectively electrically connected to the subarray 1052-1 and the subarray 1052-n. The configuration in which the subarray 1052 set the two columns as unit is an example, and the other number of columns may also be used.

Figure 11:
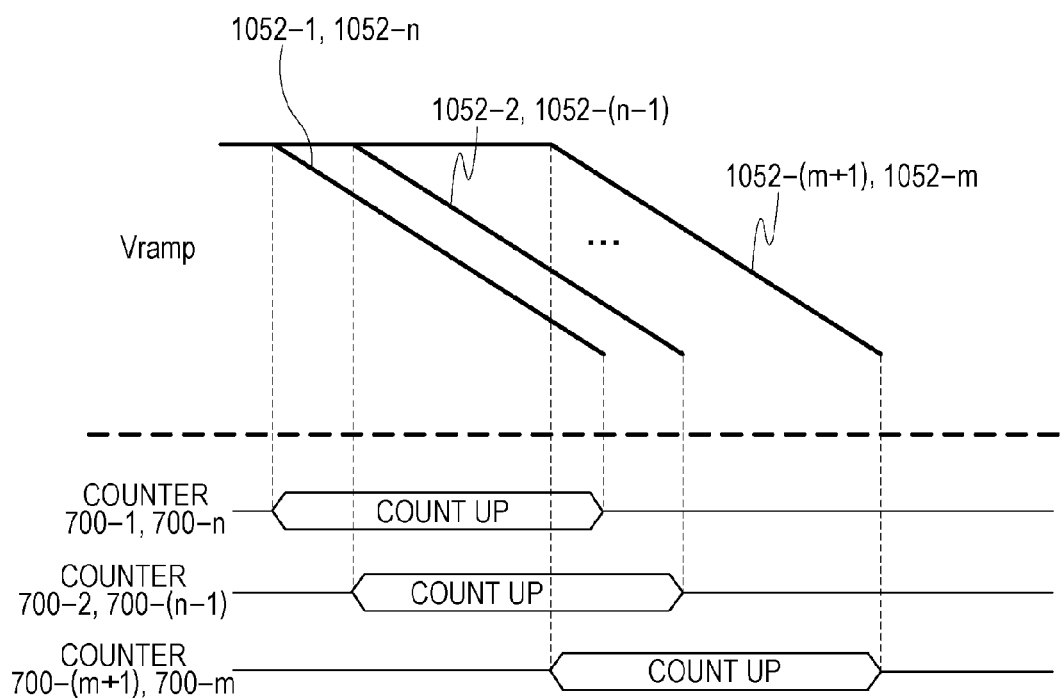
FIG. 11 is a timing chart of an example of another operation by the image pickup apparatus.

FIG. 11 illustrates the waveforms of the reference signals Vramp in the respective subarrays 1052. The progressive reduction of the reference signal Vramp is started first in the subarray 1052-1 and the subarray 1052-n closest to the current output units 501 and 502 among the n subarrays 1052. In the image pickup apparatus illustrated in FIG. 9, the wiring length from the current output units 501 and 502 is increased as the location is farther into the inner side of the pixel array 100, the progressive reduction start timing of the reference signal Vramp is more delayed.

According to the present embodiment, as illustrated in FIG. 11, the count start timings of the counters 700 can be matched with the progressive reduction start timings of the reference signals Vramp in the respective subarrays 1052 electrically connected to the respective subarrays 1052. According to this, the image pickup apparatus according to the present embodiment can attain the effects similar to the first embodiment.

Eighth Embodiment

Hereinafter, the image pickup apparatus according to the present embodiment will be described with reference to the drawings. In the following explanation, a point different from the first embodiment will mainly be described.

Figure 12:
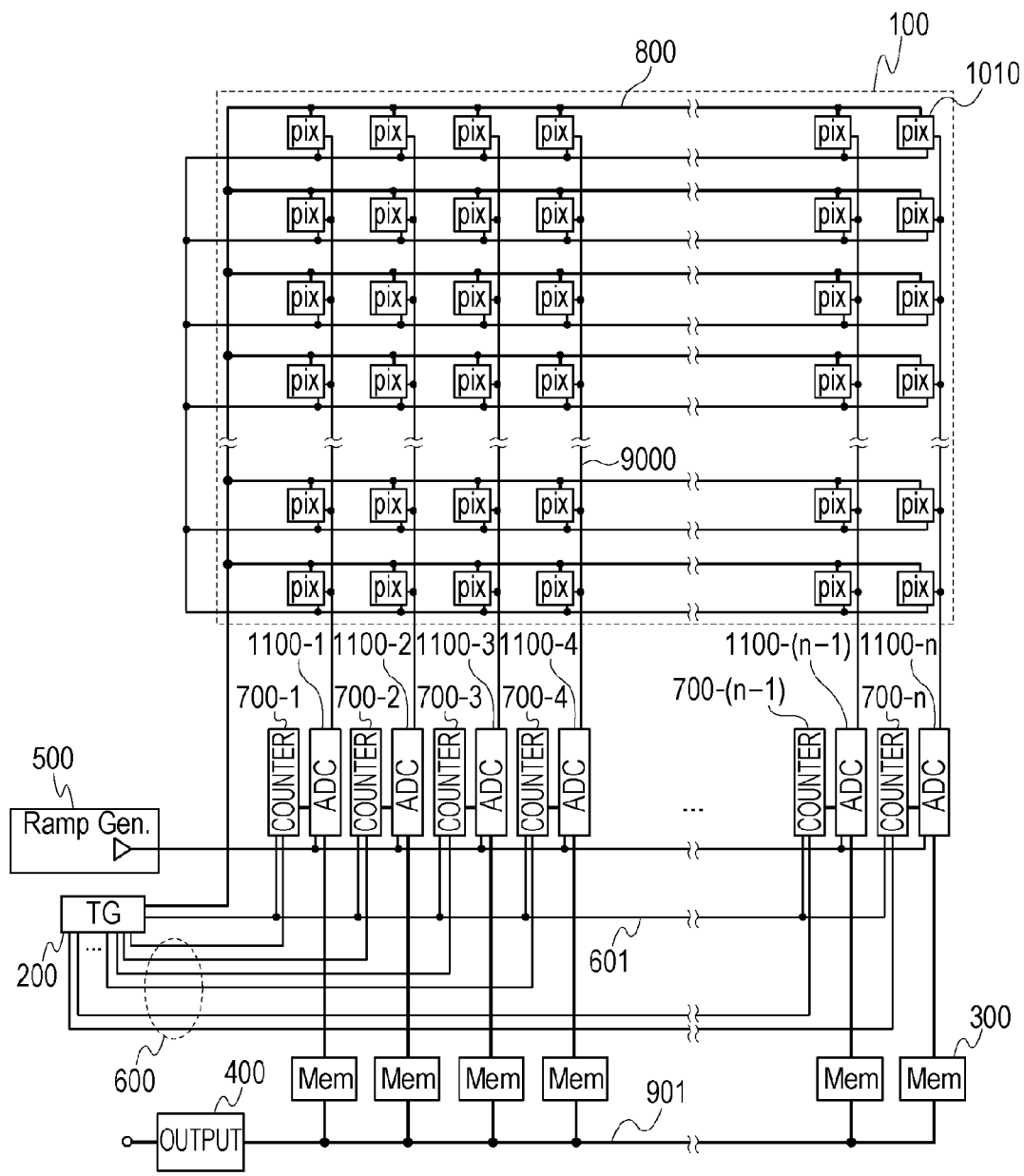
FIG. 12 is a block diagram of another example of the image pickup apparatus.

FIG. 12 is a block diagram illustrating a configuration of the image pickup apparatus according to the present embodiment. In the image pickup apparatus exemplified in FIG. 12, a component having the same function as that in FIG. 1 is assigned with the same reference symbol as that of FIG. 1, and a description thereof will be omitted.

The image pickup apparatus according to the present embodiment does not include the AD conversion unit ADC for each pixel but includes an AD conversion unit 1100 with respect to one column of the pixels 1010. An analog signal is output from the pixel 1010 to the AD conversion unit 1100 via a vertical signal line 9000. An image signal is digitalized in the AD conversion unit 1100 and sent to the line memory 300. One counter 700 is electrically connected to one AD conversion unit 1100. The counter start signals are output from the TG 200 to the respective counters 700 via the counter start signal output line 600.

Figure 13A:
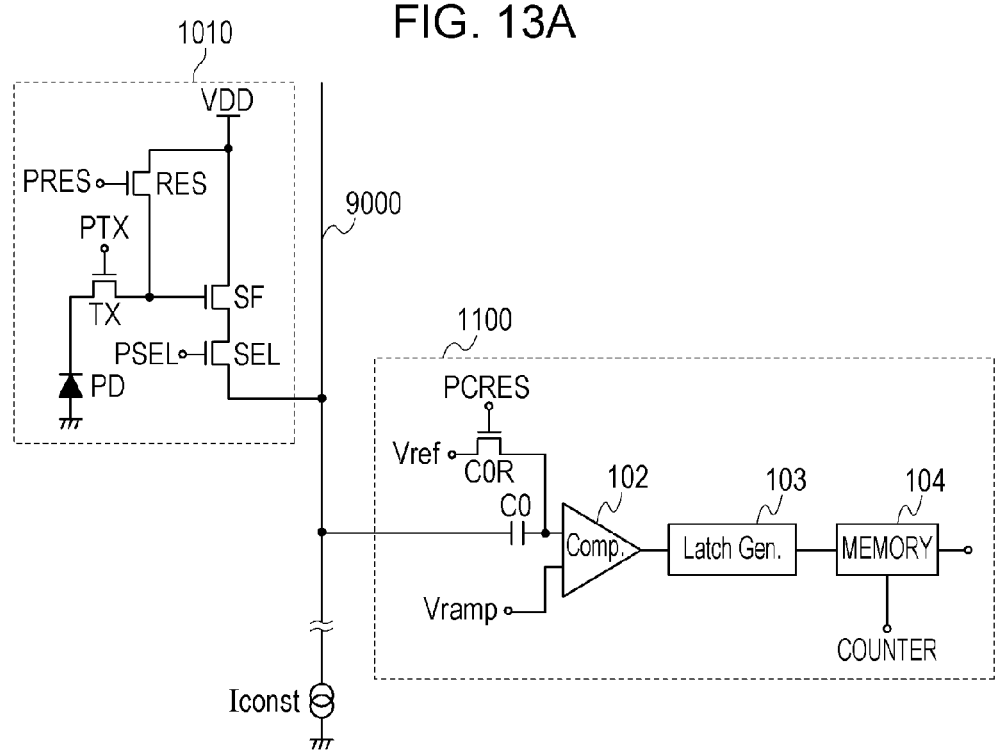
FIG. 13A is a block diagram of another example of the pixel and an AD conversion unit.

FIG. 13A illustrates configurations of the pixels 1010 and the AD conversion unit 1100 according to the present embodiment. The photoelectric conversion unit PD generates and accumulates charge in accordance with the incident light quantity. When the TG 200 sets the signal PTX for controlling the continuity of the transistor TX at the H level, the charge accumulated in the photoelectric conversion unit PD is transferred to the control node of the transistor SF. When the TG 200 sets a signal PSEL at the H level, a signal output from the transistor SF is output to the vertical signal line 9000 via a transistor SEL. The signal output to the vertical signal line 9000 is supplied to the AD conversion unit 1100. A configuration of the AD conversion unit 1100 is the same as that of the AD conversion unit ADC in the pixels 101 according to the first embodiment.

In the image pickup apparatus according to the present embodiment, the reference signal output unit 500 is located on the left side of the AD conversion unit 1100. The reference signal output unit 500 outputs the reference signal Vramp to all the AD conversion units 1100. In a mode in which the AD conversion unit 1100 is provided for each pixel column like the image pickup apparatus according to the present embodiment too, the delay of the reference signal Vramp output to the AD conversion unit 1100 is increased as the length of the wiring from the reference signal output unit 500 is increased on the basis of the resistance of the wiring, the parasitic capacitance, and the load capacitance of the AD conversion unit 1100.

Figure 13B:
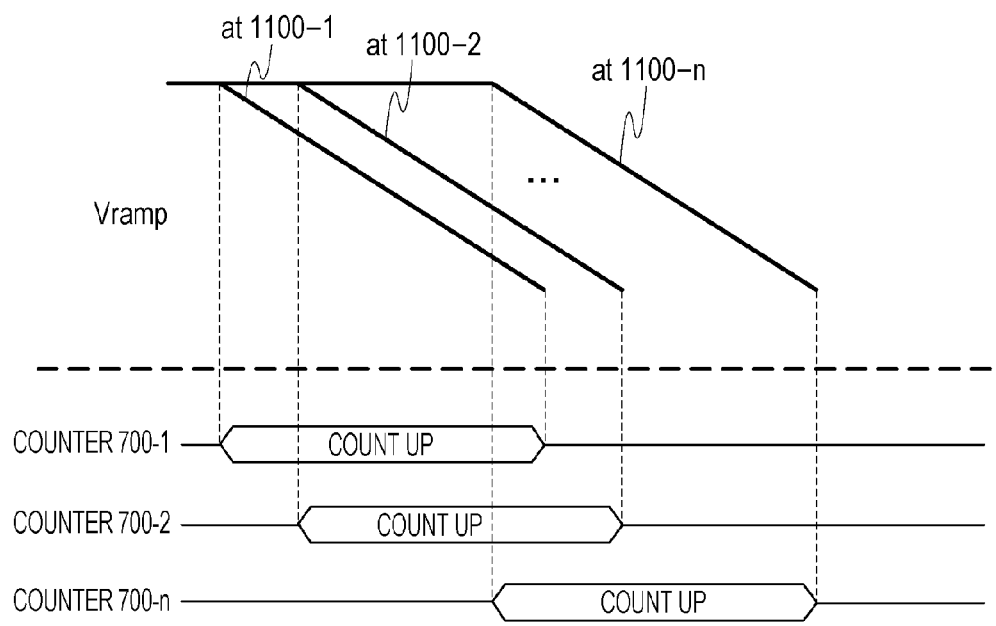
FIG. 13B is a timing chart of an example of another operation by the image pickup apparatus.

FIG. 13B illustrates waveforms of the reference signals Vramp in the respective AD conversion units 1100. The progressive reduction of the reference signal Vramp is started first in the AD conversion unit 1100-1 closest to the reference signal output unit 500. The start of the gradual reduction is delayed more for the AD conversion units on the columns towards the right side.

According to the present embodiment, as illustrated in FIG. 13B, the count start timings of the counters 700 electrically connected to the AD conversion unit 1100 can be matched with the progressive reduction start timings of the reference signals Vramp of the respective AD conversion units 1100. According to this, the image pickup apparatus according to the present embodiment can attain the effects similar to the first embodiment.

Ninth Embodiment

Hereinafter, the image pickup apparatus according to the present embodiment will be described with reference to the drawings. In the following explanation, a point different from the eighth embodiment will mainly be described.

Figure 14:
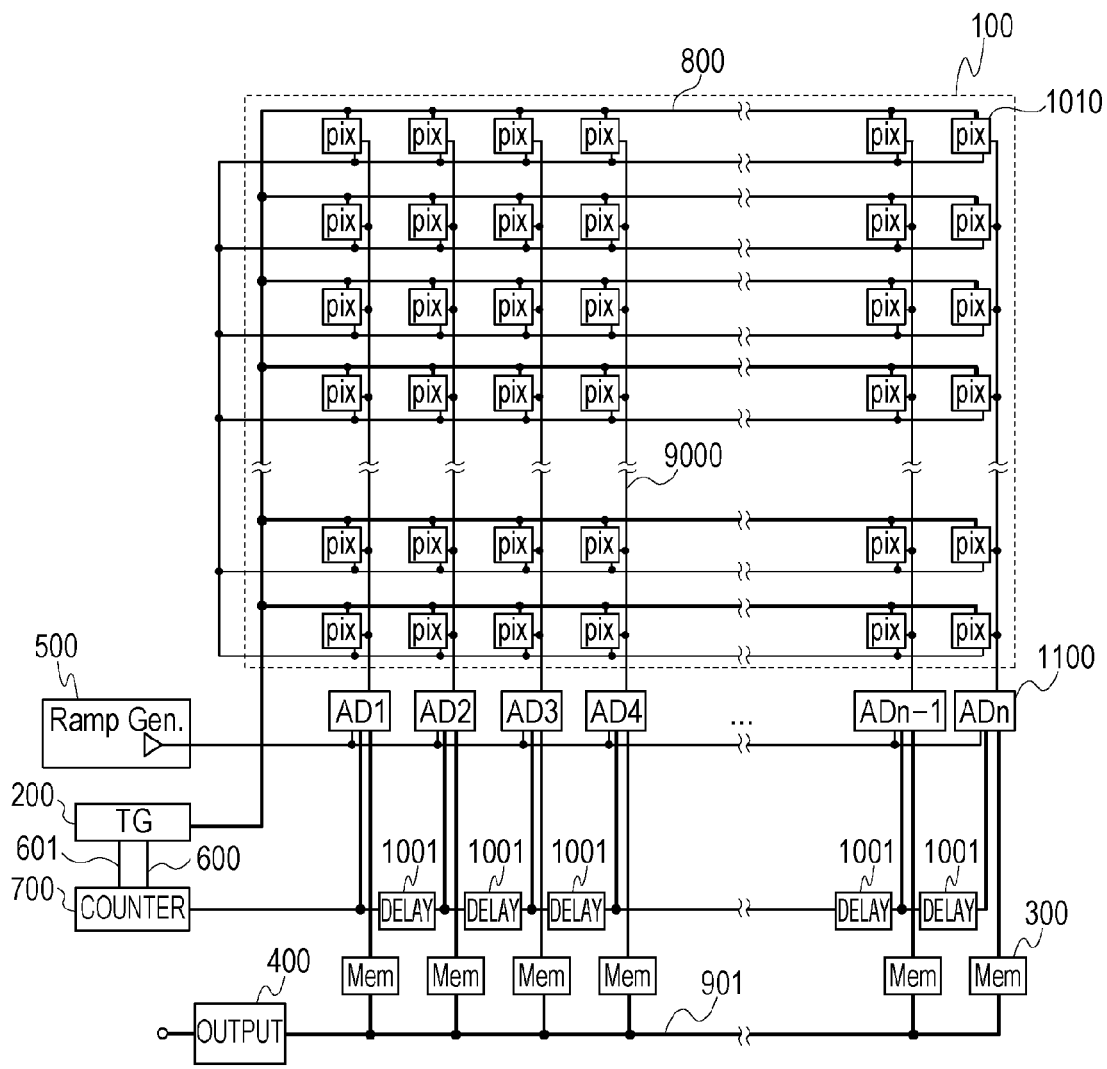
FIG. 14 is a block diagram of another example of the image pickup apparatus.

FIG. 14 is a block diagram illustrating a configuration of the image pickup apparatus according to the present embodiment. In the image pickup apparatus exemplified in FIG. 14, a component having the same function as FIG. 12 is assigned with the same reference symbol as that of FIG. 12, and a description thereof will be omitted.

In the image pickup apparatus according to the present embodiment, one counter is used. The counter 700 is located on the left side of the AD conversion unit 1100 similarly to the reference signal output unit 500. The count signal is output from the counter 700 to the respective AD conversion units 1100. The image pickup apparatus according to the present embodiment includes the delay circuit 1001 on the output line for the count signal output from the counter 700 to the respective AD conversion units 1100. The delay circuit 1001 according to the present embodiment corresponds to a count signal control unit configured to delay the count signals output to the respective AD conversion units 1100.

The delay amount generated in the delay circuit 1001 is matched with the delay amount of the reference signal Vramp. According to this, as illustrated in FIG. 13B, the count start timings of the counters 700 can be matched with the progressive reduction start timings of the reference signals Vramp in the respective AD conversion units 1100. Therefore, the image pickup apparatus according to the present embodiment can attain the effects similar to the eighth embodiment.

Tenth Embodiment

Figure 15:
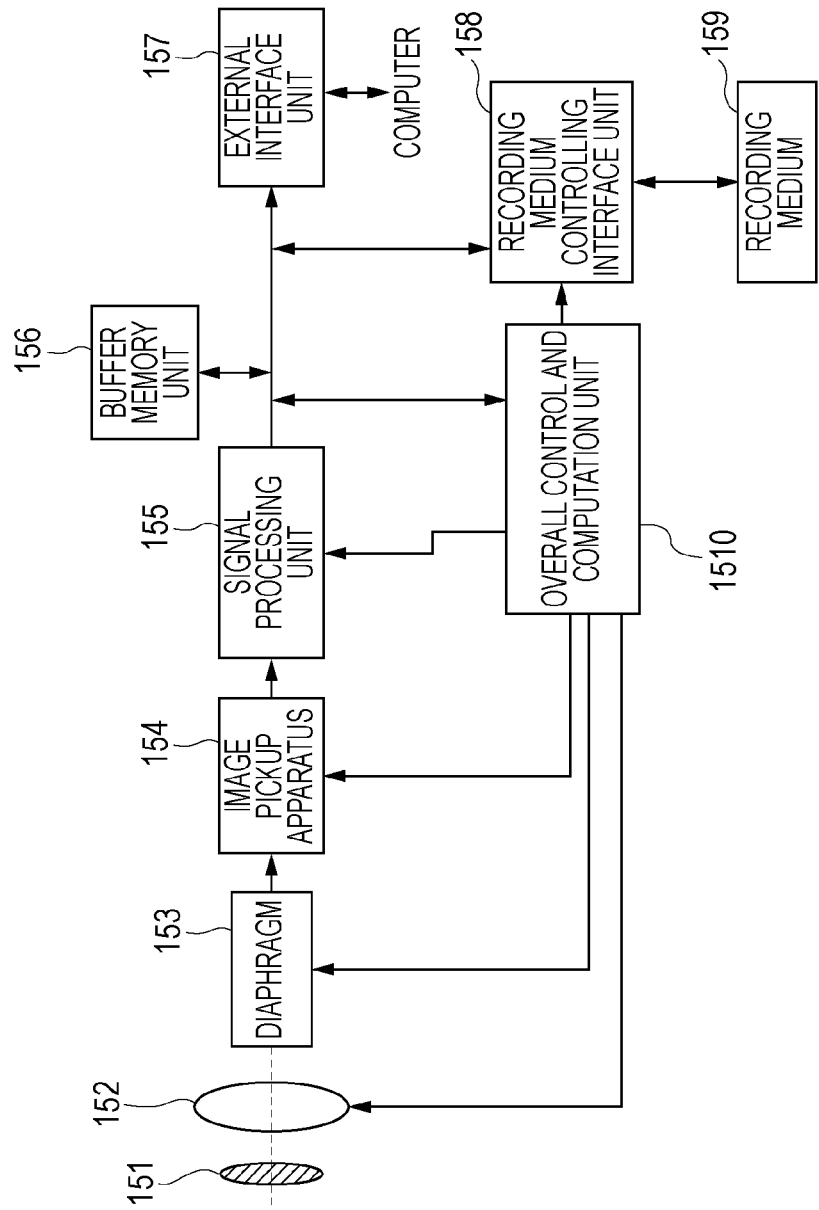
FIG. 15 is a block diagram of an example of an image pickup system.

FIG. 15 illustrates an image pickup system including the image pickup apparatus.

In FIG. 15, the image pickup system includes a barrier 151 for protecting a lens, a lens 152 for imaging an optical image of a subject on an image pickup apparatus 154, and a diaphragm 153 that can set the quantity of the light that passes through the lens 152 to be variable. The image pickup system further includes a signal processing unit 155 configured to perform processing on a signal output from the image pickup apparatus 154. The signal output from the image pickup apparatus 154 corresponds to an image pickup signal for generating an image obtained through the image pickup of the subject. The signal processing unit 155 generates an image by appropriately performing various corrections and compressions on the image pickup signal output from the image pickup apparatus 154. The lens 152 and the diaphragm 153 correspond to an optical system that focuses the light on the image pickup apparatus 154.

The image pickup system exemplified in FIG. 15 further includes a buffer memory unit 156 that temporarily stores image data and an external interface unit 157 that performs a communication with an external computer or the like. The image pickup system further includes a detachably attachable recording medium 159 such as a semiconductor memory or the like for recording or reading out the image pickup data and a recording medium controlling interface unit 158 configured to perform recording or reading out with respect to the recording medium 159. The image pickup system further includes an overall control and computation unit 1510 configured to control various computations and the entire digital still camera.

The image pickup apparatus 154 provided to the image pickup system illustrated in FIG. 15 can adopt the mode described according to the first embodiment. According to this, it is possible to attain the effects described according to the first embodiment in the image pickup apparatus 154 in the image pickup system of FIG. 15 too.

The signal processing unit 155 may also detect the delay amount of the reference signal Vramp between the plural analog-to-digital conversion units on the basis of the digital signal output from the image pickup apparatus 154. The delay amount of the counter start signal is then set on the basis of the detected delay amount, and the delay amount set in the image pickup apparatus is output. According to this, it is possible to set the start timings of the count operation conducted by the respective counters 700 of the image pickup apparatus. According to this, it is possible to attain the effects described according to the first embodiment.

Others

The above-described respective embodiments are for illustrative purposes for describing the present invention, and the configurations may be modified or combined with the other embodiment within a scope without departing from the gist of the present invention.

According to the present specification, the mode has been described in which the reference signal Vramp relies on time, and the potential is smoothly changed. As another more, the reference signal Vramp may rely on time, and the potential may be changed stepwise. In addition, according to the present specification, the mode has been described in which the reference signal Vramp relies on time, and the potential is gradually reduced. As another more, the reference signal Vramp may rely on time, and the potential may gradually be increased. It suffices if a mode in which the reference signal Vramp relies on time and the signal level is changed is employed including the mode in which the potential is changed stepwise and the mode in which the potential relies on time and is gradually increased described above.

According to embodiments of the present invention, it is possible to reduce the noise included in the digital signal which is caused in the analog-to-digital conversion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-040676 filed Mar. 1, 2013, which is hereby incorporated by reference herein in its entirety.

What is claimed is:
1. An image pickup apparatus comprising:
a plurality of incident ray conversion units each configured to convert incident rays into charge;
a plurality of analog-to-digital conversion units each provided with a comparator and configured to convert a signal output from the incident ray conversion units into a digital signal;
a plurality of counters each configured to output a count signal obtained by counting clock signals; and
a reference signal output unit configured to output a reference signal to each of the comparators of the plurality of analog-to-digital conversion units,
wherein a part of the analog-to-digital conversion units among the plurality of analog-to-digital conversion units generate the digital signal based on a result of a comparison conducted by the comparator between the signal output by the incident ray conversion unit and the reference signal and the count signal output by a part of the counters among the plurality of counters,
wherein the other part of the analog-to-digital conversion units among the plurality of analog-to-digital conversion units generate the digital signal based on a result of a comparison conducted by the comparator between the signal output by the incident ray conversion unit and the reference signal and the count signal output by the other part of the counters among the plurality of counters, and
wherein the other part of the counters start, with a delay, counting the clock signals as compared with the part of the counters by a time period corresponding to a delay of the reference signal output to the comparators of the other part of the analog-to-digital conversion units with respect to the reference signal output to the comparators of the part of the analog-to-digital conversion units.

2. The image pickup apparatus according to claim 1, further comprising a plurality of pixels and at least one current output unit,
wherein each of the plurality of pixels includes the incident ray conversion unit, the analog-to-digital conversion unit, and the reference signal output unit,
wherein the current output unit outputs a current to the reference signal output unit,
wherein the reference signal output unit generates the reference signal by using the current, and
wherein the time period corresponding to the delay of the reference signal output to the comparators of the other part of the analog-to-digital conversion units with respect to the reference signal output to the comparators of the part of the analog-to-digital conversion units is a time period corresponding to a delay, with respect to the current output to the reference signal output unit of a part of the plurality of pixels, of the current output to the reference signal output unit of the other part of the plurality of pixels.

3. The image pickup apparatus according to claim 2, further comprising a pixel array including the plurality of pixels and a plurality of the current output units,
wherein the plurality of current output units are arranged so as to sandwich the pixel array.

4. The image pickup apparatus according to claim 1, further comprising a plurality of subarrays,
wherein each of the subarrays includes a plurality of the incident ray conversion units and a plurality of the analog-to-digital conversion units,
wherein the part of the counters output a common count signal to the subarrays including the part of the analog-to-digital conversion units, and
wherein the other part of the counters output a common count signal to the subarrays including the other part of the analog-to-digital conversion units.

5. The image pickup apparatus according to claim 1, further comprising a control unit and a delay circuit,
wherein the control unit outputs a start signal for causing the part of the counters and the other part of the counters to start counting the clock signals, and
wherein the start signal to be output to the other part of the counters is delayed by the delay circuit as compared with the start signal output to the part of the counters and is output to the other part of the counters, and the other part of the counters start, with a delay, counting the clock signals as compared with the part of the counters.

6. The image pickup apparatus according to claim 1, further comprising a plurality of pixels where the pixels are arranged in a plurality of columns,
wherein each of the plurality of pixels includes the incident ray conversion unit, and
wherein each of the plurality of analog-to-digital conversion units is provided corresponding to the column where the pixels are arranged.

7. The image pickup apparatus according to claim 1, further comprising a plurality of pixels,
wherein each of the plurality of pixels includes the incident ray conversion unit and the analog-to-digital conversion unit.

8. An image pickup apparatus comprising:
a plurality of incident ray conversion units each configured to convert incident rays into charge;
a first analog-to-digital conversion unit and a second analog-to-digital conversion unit each provided with a comparator and configured to convert a signal output by the incident ray conversion units into a digital signal;
a first counter configured to output a count signal obtained by counting clock signals to the first analog-to-digital conversion unit;
a second counter configured to output a count signal obtained by counting clock signals to the second analog-to-digital conversion unit; and
a reference signal output unit configured to output a reference signal in which a signal level is changed dependently on time to the comparator,
wherein each of the first analog-to-digital conversion unit and the second analog-to-digital conversion unit generates the digital signal based on a result of a comparison conducted by the comparator between a signal output by the incident ray conversion unit and the reference signal and the count signal,
wherein the second analog-to-digital conversion unit has an electric path from the reference signal output unit longer than the first analog-to-digital conversion unit has, and
wherein the second counter starts, with a delay, counting the clock signals as compared with the first counter.

9. The image pickup apparatus according to claim 8, further comprising a plurality of subarrays,
wherein each of the subarrays includes a plurality of the incident ray conversion units and a plurality of the analog-to-digital conversion units,
wherein the first counter outputs a common count signal to the subarrays including the first analog-to-digital conversion units, and
wherein the second counter outputs a common count signal to the subarrays including the second analog-to-digital conversion units.

10. The image pickup apparatus according to claim 8, further comprising a control unit and a delay circuit,
wherein the control unit outputs a start signal for causing the part of the counters and the other part of the counters to start counting the clock signals, and
wherein the start signal to be output to the other part of the counters is delayed by the delay circuit as compared with the start signal output to the part of the counters and is output to the other part of the counters, and the other part of the counters start, with a delay, counting the clock signals as compared with the part of the counters.

11. The image pickup apparatus according to claim 8, further comprising a plurality of pixels where the pixels are arranged in a plurality of columns,
wherein each of the plurality of pixels includes the incident ray conversion unit, and
wherein each of the plurality of analog-to-digital conversion units is provided corresponding to the column where the pixels are arranged.

12. The image pickup apparatus according to claim 8, further comprising a plurality of pixels,
wherein each of the plurality of pixels includes the incident ray conversion unit and the analog-to-digital conversion unit.

13. An image pickup apparatus comprising:
a plurality of incident ray conversion units;
a plurality of analog-to-digital conversion units each provided with a comparator and configured to convert a signal output from the incident ray conversion units into a digital signal;
a counter configured to output a count signal obtained by counting clock signals;

a reference signal output unit configured to output a reference signal in which a signal level is changed dependently on time to each of the comparators of the plurality of analog-to-digital conversion units; and a count signal control unit, wherein each of the plurality of analog-to-digital conversion units generates the digital signal based on a result of a comparison conducted by the comparator between a signal output by the incident ray conversion unit and the reference signal and the count signal, and wherein the count signal control unit delays, by a time period with respect to the reference signal output to a part of the analog-to-digital conversion units which corresponds to a delay of the reference signal output to the other part of the analog-to-digital conversion units, the count signal output to the other part of analog-to-digital conversion units as compared with the count signal output to the part of analog-to-digital conversion units.

14. The image pickup apparatus according to claim 13, wherein the count signal control unit is a delay circuit provided on an electric path where the count signal is transmitted to the plurality of analog-to-digital conversion units from the counter.

15. An image pickup system comprising:
the image pickup apparatus according to claim 1; and
a signal processing unit configured to process the digital signal output from the image pickup apparatus.

16. A drive method for an image pickup apparatus including:
a plurality of incident ray conversion units;
a plurality of analog-to-digital conversion units each provided with a comparator and configured to convert a signal output from the incident ray conversion units into a digital signal;
a plurality of counters each configured to output a count signal obtained by counting clock signals; and
a reference signal output unit configured to output a reference signal to each of the comparators of the plurality of analog-to-digital conversion units,
a part of the analog-to-digital conversion units among the plurality of incident ray conversion units generating the digital signal based on a result of a comparison conducted by the comparator between the signal output by the incident ray conversion unit and the reference signal and the count signal output by a part of the counters among the plurality of counters, and
the other part of the analog-to-digital conversion units among the plurality of analog-to-digital conversion units generating the digital signal based on a result of a comparison conducted by the comparator between the signal output by the incident ray conversion unit and the reference signal and the count signal output by the other part of the counters among the plurality of counters, the drive method comprising:
detecting a delay amount of the reference signal output to the comparators of the other part of the analog-to-digital conversion units with respect to the reference signal output to the comparators of the part of the analog-to-digital conversion units; and
causing the other part of the counters to start, with a delay, counting the clock signals as compared with the part of the counters based on the delay amount.

17. A drive method for an image pickup system that includes:
an image pickup apparatus including
a plurality of incident ray conversion units each configured to convert incident rays into charge,
a plurality of analog-to-digital conversion units each provided with a comparator and configured to convert a signal output from the incident ray conversion units into a digital signal,
a plurality of counters each configured to output a count signal obtained by counting clock signals,
a reference signal output unit configured to output a reference signal in which a signal level is changed dependently on time to each of the comparators of the plurality of analog-to-digital conversion units, and
a control unit; and
a signal processing unit configured to process the digital signal output by the image pickup apparatus,
a part of the analog-to-digital conversion units among the plurality of incident ray conversion units generating the digital signal based on a result of a comparison conducted by the comparator between the signal output by the incident ray conversion unit and the reference signal and the count signal output by a part of the counters among the plurality of counters, and
the other part of the analog-to-digital conversion units among the plurality of incident ray conversion units generating the digital signal based on a result of a comparison conducted by the comparator between the signal output by the incident ray conversion unit and the reference signal and the count signal output by the other part of the counters among the plurality of counters,
the drive method comprising:
causing the signal processing unit to detect a delay amount of the reference signal output to the comparators of the other part of the analog-to-digital conversion units with respect to the reference signal output to the comparators of the part of the analog-to-digital conversion units based on the digital signals generated by the plurality of analog-to-digital conversion units; and
causing the control unit to allow the other part of the counters to start, with a delay, counting the clock signals as compared with the part of the counters based on the delay amount.

* * * * *